US006503294B2

(12) United States Patent
Yoshikawa et al.

(10) Patent No.: US 6,503,294 B2
(45) Date of Patent: Jan. 7, 2003

(54) PERMEABLE MEMBRANE AND METHOD

(75) Inventors: Masahito Yoshikawa, Aichi (JP); Yuji Ozeki, Aichi (JP); Takashi Taniguchi, Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/795,234

(22) Filed: Feb. 28, 2001

(65) Prior Publication Data

US 2001/0020416 A1 Sep. 13, 2001

Related U.S. Application Data

(63) Continuation of application No. PCT/JP99/04648, filed on Aug. 27, 1999.

(30) Foreign Application Priority Data

Aug. 28, 1998 (JP) ............................................ 10-243254
Oct. 23, 1998 (JP) ............................................ 10-302311

(51) Int. Cl.$^7$ .............................................. B01D 53/22
(52) U.S. Cl. ........................ 95/45; 95/55; 96/11; 96/12
(58) Field of Search ................................ 95/45, 47–56; 96/4, 10–14

(56) References Cited

U.S. PATENT DOCUMENTS

| | | | | |
|---|---|---|---|---|
| 4,925,459 A | * | 5/1990 | Rojey et al. ..................... 95/50 |
| 5,104,425 A | * | 4/1992 | Rao et al. ....................... 95/47 |
| 5,378,440 A | * | 1/1995 | Herbst et al. ................. 95/45 X |
| 5,429,743 A | * | 7/1995 | Geus et al. .................... 96/4 X |
| 5,431,864 A | * | 7/1995 | Rao et al. ..................... 96/11 X |
| 5,487,774 A | * | 1/1996 | Peterson et al. ............. 95/50 X |
| 5,507,860 A | * | 4/1996 | Rao et al. .................... 95/55 X |
| 5,649,996 A | * | 7/1997 | Soffer et al. ................. 95/45 X |
| 5,702,503 A | * | 12/1997 | Tse Tang ...................... 95/45 |
| 5,753,011 A | * | 5/1998 | Sircar et al. ................. 95/49 X |
| 5,753,121 A | * | 5/1998 | Geus et al. .................. 96/11 X |
| 5,772,735 A | * | 6/1998 | Sehgal et al. .................. 95/45 |
| 5,827,569 A | * | 10/1998 | Akiyama et al. ............. 96/11 X |
| 5,871,650 A | * | 2/1999 | Lai et al. .................... 96/11 X |
| 5,935,440 A | * | 8/1999 | Bratton et al. ................ 96/4 X |
| 5,942,119 A | * | 8/1999 | Deckman et al. ............ 95/45 X |
| 5,968,366 A | * | 10/1999 | Deckman et al. ............ 95/45 X |
| 5,972,079 A | * | 10/1999 | Foley et al. ................. 95/54 X |
| 6,033,458 A | * | 3/2000 | Goodman et al. .............. 95/45 |
| 6,039,792 A | * | 3/2000 | Calamur et al. ............... 95/45 |
| 6,051,517 A | * | 4/2000 | Funke et al. ................ 95/45 X |
| 6,074,457 A | * | 6/2000 | Anthonis et al. ............ 96/11 X |
| 6,090,289 A | * | 7/2000 | Verduijn et al. ............. 96/11 X |
| 6,193,784 B1 | * | 2/2001 | Yazawa et al. ................. 95/45 |

* cited by examiner

Primary Examiner—Robert H. Spitzer
(74) Attorney, Agent, or Firm—Schnader Harrison Segal & Lewis LLP

(57) ABSTRACT

Permeable membrane porous substrate and a functional layer provided on the surface of and/or inside the porous substrate, the functional layer having a hydrogen permeation rate of $1 \times 10^{-10}$ mol/s·m$^2$·Pa or more, and satisfying at least one of the following properties (1) through (3):

(1) Hydrogen is selectively caused to permeate preferentially to water vapor.

(2) When a test tube containing ethylene glycol and sealed with the permeable membrane is placed in a 85° C. oven, the ethylene glycol decrease rate measured is $1 \times 10^{-2}$ g/hour or less, per square centimeter (1 cm$^2$) of the permeable membrane.

(3) When a test tube containing 5% ammonium adipate ethylene glycol solution and sealed with the permeable membrane is placed in a 85° C. oven for 2 days, the acid quantity of the solution is $5 \times 10^{-3}$ equivalent or less, per square centimeter of the permeable membrane.

16 Claims, 11 Drawing Sheets

T = 3/8 inch
Tx = 1/8 inch

T = 3/8 inch
Tx = 1/8 inch

PERMEABLE MEMBRANE AND METHOD

This application is a continuation of PCT/JP99/04648 filed Aug. 27, 1999.

This invention relates to a permeable membrane having a porous substrate and a functional surface layer on the surface of and/or inside the porous substrate. This invention particularly relates to a permeable membrane suitably used for allowing the selective permeation or separation of a gas in the presence of highly polar compounds such as a vapor of water, ethylene glycol, γ-butyrolactone or ammonia for example.

This invention also relates to particular applications of the permeable membrane. The permeable membrane of this invention can be used, for example, in electrolytic capacitors and fuel cells. It allows the selective permeation of any of various gases and liquids even in the absence of a highly polar compound vapor. If the permeable membrane of this invention is used in a sealed electrolytic capacitor otherwise likely to be damaged by the pressure of the hydrogen gas generated inside the sealed container, such damage can be avoided and the capacitor life can be sufficiently extended, and the safety of the electrolytic capacitor during use can also be secured.

A fuel cell uses hydrogen as a fuel, and the hydrogen is obtained by reforming methanol or methane. The reformed gas contains water, carbon monoxide and carbon dioxide in addition to hydrogen. A membrane that allows the permeation of hydrogen but not carbon monoxide avoids poisoning the electrode catalyst by carbon monoxide. This is important. Unless the membrane causes selective permeation of hydrogen rather than water, water would be adsorbed in the pores of the membrane, reducing the permeating quantity of the hydrogen. Therefore, a membrane that allows selective permeation of hydrogen in preference to water is very important for gas separation in the presence of water vapor. Since water is smaller than hydrogen in its minimum molecular size (kinetic diameter), it is very difficult to achieve selective permeation of hydrogen in preference to water vapor.

A palladium membrane is known as a membrane allowing selective permeation of hydrogen. However, palladium is very expensive, and it is difficult to use it industrially.

In the field of electrolytic capacitors, Japanese patent Applications JP, 62-112314, A and JP, 62-272515, A propose, for example, methods of discharging hydrogen gas generated in an electrolytic capacitor outside using a hollow-yarn permeable membrane made of a polyimide, polytetrafluoroethylene or polypropylene, etc., but those methods do not sufficiently discharge hydrogen gas or prevent the increase of internal pressure. Furthermore, an electrolytic capacitor has a significant disadvantage that since the electrolyte permeates as a vapor from the electrolytic capacitor, the composition of the internal electrolyte changes, and thereby changes the characteristics of the electrolytic capacitor.

Furthermore, in recent years, membranes using a zeolite and/or a zeolite analog have been positively studied, but it is difficult to obtain a zeolite membrane having specific permeation characteristics with high reproducibility. Moreover, there has heretofore been no proposal of (1) a membrane allowing the selective permeation of hydrogen instead of water vapor from a mixture containing water vapor and hydrogen, (2) a membrane causing good permeation of hydrogen but resistant to allow the permeation of ethylene glycol, and (3) a zeolite and/or a zeolite analog membrane allowing good permeation of hydrogen but resistant to allow the permeation of ammonia.

DISCLOSURE OF THE INVENTION

An object of this invention is to overcome the disadvantages of the above prior art by providing a permeable membrane not substantially containing any expensive metal having affinity with hydrogen, excellent in heat resistance and chemicals resistance, and allowing good permeation of hydrogen, and (1) resistant to permeation of water vapor instead of hydrogen, (2) resistant to permeation of ethylene glycol vapor, or (3) resistant to permeation of ammonia gas.

Another object of this invention relates to an application of the permeable membrane and the related art by providing an electrolytic capacitor having said permeable membrane for effectively utilizing the permeability of the permeable membrane.

A further other object of this invention is to provide a method for producing a zeolite membrane preferably used as the functional layer of said permeable membrane, and an MFI zeolite membrane as an embodiment of the zeolite membrane.

A further other object of this invention is to provide a method for separating at least one kind of molecules by using said permeable membrane or MFI zeolite membrane for allowing the permeation of at least one kind of molecules from a gas or liquid mixture consisting of at least two kinds of molecules.

The inventors studied intensively to achieve the above objects, and as a result, arrived at this invention having the following constitution.

The subject matter of this invention is a permeable membrane, (a) comprising a porous substrate and a functional layer provided on the surface of and/or inside the porous substrate, (b) having a hydrogen permeation rate of $1 \times 10^{-10}$ m$^2$·sec·Pa or more, and (c) satisfying at least one of the following conditions:

(1) Hydrogen is selectively allowed to permeate rather than water vapor.

(2) When a test tube containing ethylene glycol and sealed with said permeable membrane is placed in an 85° C. oven, the ethylene glycol decrease rate measured is $1 \times 10^{-2}$ g/hour or less per 1 cm$^2$ of the permeable membrane.

(3) When a test tube containing 5% ammonium adipate ethylene glycol solution and sealed with said permeable membrane is placed in an 85° C. oven for 2 days, the acid quantity of the solution is $5 \times 10^{-3}$ equivalent or less per 1 cm$^2$ of the permeable membrane.

It is preferable that the functional layer of the permeable membrane of this invention contains at least one of the following ingredients (1) through (5):

(1) A zeolite and/or zeolite analog (2) Fine inorganic oxide grains (3) A silicone rubber, silicone resin or silicone oil (4) An organic macromolecular compound (5) Carbon The permeable membrane of this invention includes the following as preferable modes:

(1) The functional layer as the outermost surface layer is covered with a silicone compound and is made of a zeolite and/or zeolite analog.

(2) The zeolite and/or zeolite analog is high silica and/or pure silica zeolite.

(3) The permeable membrane is $2 \times 10^{-7}$ mol/m$^2$·s·Pa or less in the difference between the hydrogen permeation rate at room temperature after calcining the permeable membrane and the hydrogen permeation rate at room temperature immediately after keeping 85° C. ethylene glycol saturated vapor in contact with the permeable membrane for 24 hours.

Further subject matter of this invention is an electrolytic capacitor using said permeable membrane. The capacitor includes preferable modes that the permeable membrane is mounted at a sealing plug with an elastic body intervening between the permeable membrane and the sealing plug, and that the permeable membrane has an inorganic porous substrate and a functional layer.

Further subject matter of this invention is a method for producing a membrane containing a zeolite or zeolite analog, comprising the step of treating a membranous substance containing a seed crystal of a zeolite or zeolite analog and silica, with water vapor. In the production method of this invention, it is preferable to bring a seed crystal of a zeolite or zeolite analog into contact with a porous substrate beforehand, and to coat the porous substrate with a solution, slurry or colloid containing silica, for forming a membranous substance, and then to treat with water vapor. In this case, it is preferable that the water vapor treatment temperature is 80 to 200° C.

Further subject matter of this invention is an MFI zeolite membrane satisfying the following two conditions:

(1) a/b=0.3 to 1.5

(2) b/c>4.4 where a is the maximum peak intensity within a 2θ range of 7.3 to 8.3 degrees, b is the maximum peak intensity within a 2θ range of 8.5 to 9.1 degrees, and c is the maximum peak intensity within a 2θ range of 13.0 to 14.2 degrees, respectively in the diffraction pattern obtained by X-ray diffractometry using CuKα as the X-ray source with the incident angle fixed at 3 degrees at a scanning speed of 2θ 4 degrees/min in a parallel optical system.

Further subject matter of this invention is a method for separating at least one kind of molecules by bringing a gas or liquid mixture composed of at least two kinds of molecules into contact with the permeable membrane or MFI zeolite membrane, for allowing the preferential permeation of at least one kind of these molecules.

THE BEST MODES FOR CARRYING OUT THE INVENTION

Figure 1:
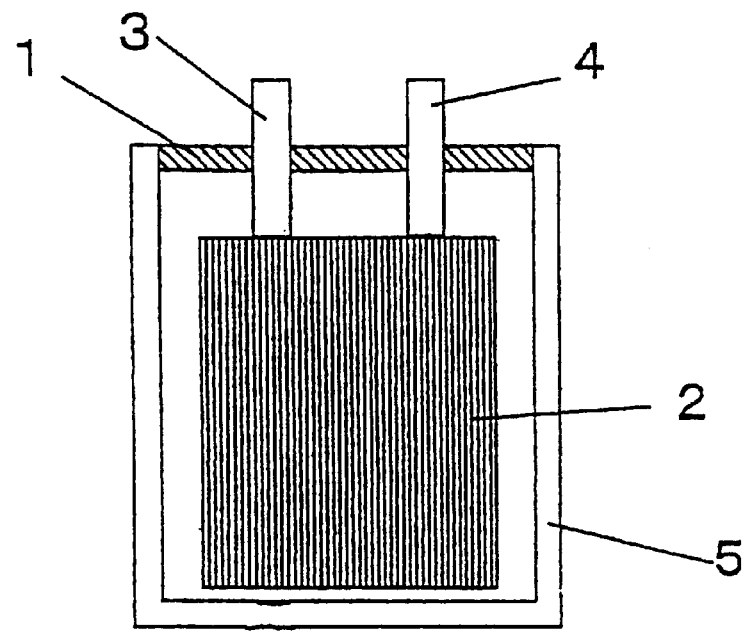
FIG. 1 is a schematic cross sectional view showing an example of an electrolytic capacitor using the permeable membrane of this invention.

At first the permeable membrane of this invention itself is described below.

It is essentially required that the permeable membrane of this invention (a) comprises a porous substrate and a functional layer provided on the surface of and/or inside the porous substrate, (b) has a hydrogen permeation rate of $1 \times 10^{-10}$ mol/m$^2$·sec·Pa or more, and (c) satisfies at least one of the following conditions:

(1) Hydrogen is selectively allowed to permeate rather than water vapor.

(2) When a test tube containing ethylene glycol and sealed with said permeable membrane is placed in an 85° C. oven, the ethylene glycol decrease rate measured is $1 \times 10^{-2}$ g/hour or less per 1 cm$^2$ of the permeable membrane.

(3) When a test tube containing 5% ammonium adipate ethylene glycol solution and sealed with said permeable membrane is placed in an 85° C. oven for 2 days, the acid quantity of the solution is $5 \times 10^{-3}$ equivalent or less per 1 cm$^2$ of the permeable membrane.

It is essentially required that the permeable membrane of this invention contains a porous substrate and a functional layer provided on the surface of and/or inside the porous substrate. The functional layer refers to a layer having functions showing the permeation characteristics specified in the above (b) and (c). In order that the layer has the selectivity of the above (c) while showing the permeability of the above (b), the material and compactness of the functional layer are important. In addition, it is preferable that the functional layer (which also may be called the functional film) has less thickness. The preferable thickness of the functional film depends on the selected material of the functional film, but 500 μm or less is preferable; 100 μm or less is more preferable. It is preferable that the functional film is thinner, but it is not allowed that the thickness is small at the sacrifice of compactness.

Since a thin film alone is low in strength, it is one of the features of this invention to overcome the low strength of the functional layer by forming the functional layer at least on one surface of and/or inside a porous substrate.

Porous Substrate

The porous substrate of this invention is used to prevent breakage a thin and weak or fragile functional layer per se. It is preferable that the porous substrate is rigid.

An easily pliable porous substrate may not be able to protect the functional layer from being broken. If the porous substrate is a film having such strength as to allow breaking with a simple hand touch, it is not suitable for industrially practical use.

Furthermore, since this invention relates to a permeable membrane, it is necessary that the substrate used for supporting the functional layer is so porous that the permeability of the functional layer is not inhibited.

The material of the porous substrate is not especially limited if it has properties as described above, and can be, for example, a metal, a ceramic metal oxide or an organic polymer. In view of strength and rigidity, a metal or a ceramic metal oxide can be preferably used. Above all, in view of heat resistance and chemicals resistance, a metal oxide can be most preferably used. The kind of metal oxide is not especially limited, but alumina, zirconia, silica, mullite, cordierite, titania, zeolite or zeolite analog can be preferably used. As a metal, for example, a porous substrate of stainless steel (sintered metal) can be used. For applications not requiring heat resistance, a porous substrate of an organic polymer can also be used if it is rigid. Also in this case, to prevent breakage of the functional layer portion, it is preferable that the porous substrate has such rigidity as not to allow visible bending when it is attempted to manually bend the substrate.

The form of the porous substrate is not especially limited either. Any usually commercially available form such as sphere, flat plate, tube, monolith or honeycomb can be used. For use as an electrolytic capacitor, the most preferable form of the porous substrate is a cylindrically formed flat plate. For use as a separation membrane, the porous substrate is required to have a large surface area, and a tube, monolith or honeycomb is preferable.

The method for producing the porous substrate used in this invention is not especially limited. Usually for example, a powder of a ceramic, or a powder of a ceramic containing a molding aid and a binder can be extrusion-molded or press-molded, and dried and calcined into a porous substrate.

The optimum calcination temperature depends on the material of the porous substrate, but a temperature causing some sintering to start is desirable in view of strength. A suitable burning temperature depends on the material and grain size, but is generally 600 to 2,000° C. A preferable range is 800 to 1,500° C., and an especially preferable range is 900 to 1,400° C. After completion of burning, the porous substrate can also be washed using a chemical solution, etc. It is also preferable to coat the molded porous substrate with fine grains, for example, by dip coating, for controlling the pore size of the porous substrate or for controlling the affinity with the functional layer or for controlling the surface roughness. The layer formed by such coating is called an intermediate layer, and it is preferable to form one or more such intermediate layers in use of any functional layer.

If the pore size of the porous substrate is too large, the functional layer cannot be formed as a film and may have holes formed, or the raw solution of the functional layer may infiltrate into the pores of the porous substrate so much as to finally close the pores of the porous substrate with the functional layer. That is, since the gas permeation distance in the functional layer becomes too long, the gas permeation quantity cannot be large enough. So, it is preferable that the average pore size of the porous substrate is 10 μm or less. More preferable is 5 μm or less, and further more preferable is 1 μm or less. Especially preferable is less than 0.5 μm. Also for controlling the pore size like this, the above-mentioned intermediate layer can be preferably used. The lower limit of the average pore size depends on the size of the molecules to permeate, and cannot be specified. Depending upon the permeability of desired molecules, it is desirable that the average pore size is 0.01 μm or more.

The average pore size can be measured using an ordinary mercury porosimeter. As a simple measure, if the ceramic grains forming the intermediate layer are uniform in size, it can be roughly said that the size of the grains is the average pore size.

Functional Layer

In the permeable membrane of this invention, the functional layer can be formed at any portion of the porous substrate. The functional layer can be formed on one surface or both surfaces of the porous substrate or inside the substrate or both on the surfaces of and inside the substrate. In the formation of the functional layer, it is preferable to form the functional layer on the surface of the porous substrate to obtain layer thickness control, and to form the functional layer inside the porous substrate in view of strength. If the porous substrate is tubular, the functional layer can be formed either on the inside surface or on the outside surface of the substrate. Also when the form of the porous substrate is a monolith or honeycomb, the functional layer can be formed anywhere. However, forming the functional layer on the inside surface is preferable since the surface area can be larger.

The material of the functional layer is not especially limited, provided the layer has the above-mentioned functions of (b) and (c), and it is more preferable that the functional layer contains one or more of the following ingredients (1) through (5).

(1) A zeolite and/or zeolite analog
(2) Fine inorganic oxide grains
(3) A silicone rubber, silicone resin or silicone oil
(4) An organic macromolecular compound
(5) Carbon The reasons why the above five ingredients are excellent as the functional layer are not clear at present, but is estimated to be that the ingredients have pores of the molecular size called micropores having specific adsorbing propertios or have hydrophobicity. The above ingredients (1), (2) and (5) can form micropores inside or outside the grains. The above ingredients (1), (3), (4) and (5) can have hydrophobicity. The above materials (1) and (5) can be especially preferably used, since they can provide two functions of micropores and hydrophobicity by controlling their compositions.

For the functional layer of this invention, any one of the five ingredients (1) through (5) can be used, but if two or more ingredients are used in combination, it can happen that the properties of both the ingredients are combined to provide better performance. So, a combination of two or more ingredients can preferably be adopted. It is most preferable that the functional layer has pores of molecular sizes and hydrophobicity.

The zeolite or zeolite analog of (1) is a crystalline inorganic oxide having pores of molecular size. "Molecular size" refers to a range of sizes of molecules existing in the world, and generally means a range of 2 to 20 angstroms. A zeolite or zeolite analog (these may also be generically called a "zeolite" in this invention) is a crystalline microporous substance made of, for example, a crystalline silicate, crystalline aluminosilicate, crystalline metallosilicate, crystalline aluminophosphate or crystalline metalloaluminophosphate.

The crystalline silicate, crystalline aluminosilicate, crystalline metallosilicate, crystalline aluminophosphate, and crystalline metalloaluminophosphate are not especially limited in kind, and for example, crystalline inorganic porous materials having structures described in Atlas of Zeolite Structure Types [W. M. Meier, D. H. Olson, Ch. Baerlocher, Zeolites, 17(1/2), 1996] can be enumerated.

As for the kind of the zeolite, a zeolite having the samller pore apertures in size is preferable, and 2 to 8 Å is especially preferable. A more preferable range is 2 to 6 angstroms. To refer to the size of pores, an expression of oxygen n-membered ring is often used, and in this invention, a zeolite having pores with a 5-membered ring to a 12-membered ring size can be preferably used. Especially preferable is a zeolite with 10- or less-membered ring size pores. Examples of such zeolites include the zeolites descibred in Atlas of Zeolite Structure Types [W. M. Meier, D. H. Olson, Ch. Baerlocher, Zeolites, 17(1/2), 1996]]. To name them in reference to the structures respectively expressed by three letters, they are zeolites with structures of ABW, AEI, AFG, AFT, AFX, ANA, APC, ATN, ATO, ATT, ATV, AWW, BIK, BRE, CAN, CAS, CHA, CHI, DAC, DDR, DOH, EAB, EDI, ERI, EUO, FER, GIS, GOO, JBW, ZK-5, LAU, LEV, LIO, LOS, LOV, LTA, LTN, MEL, MEP, MER, MFI, MFS, MON, MTN, MTT, NON, PAU, RHO, RON, RSN, RTE, RTH, RUT, SGT, THO, TON, VET, VNI, VSV, WEI, WEN, YUG and ZON.

The composition of the zeolite is not especially limited, but a zeolite having a higher silica content is preferable. In general, a zeolite can separate molecules in reference to differences of sizes referred to as a molecular sieve. The minimum molecular sizes (kinetic diameters) of hydrogen, water, carbon monoxide and carbon dioxide are respectively 2.89, 2.6, 3.76 and 3.3 angstroms [Breck, Zeolite Molecular Sieves (1974, John Willy & Sons), pages 636-637]. In view of the minimum molecular sizes, it is very difficult to cause selective permeation of hydrogen only out of a mixed gas consisting of water and hydrogen. This invention is very significant in because such difficult selective permeation of hydrogen is achieved.

The mechanism underlying selective permeation of only hydrogen has not yet been clarified, but it is considered to be necessary that there are pores that are sized to allow the permeation of hydrogen and that the surface and/or pores of the membrane have a hydrophobic nature to repel water. From this point of view, it is preferable to use a high silica zeolite or a pure silica zeolite. Therefore, it is preferable that the zeolite used is a crystalline silicate zeolite, or a crystalline aluminosilicate zeolite, or a crystalline metallosilicate zeolite, or a zeolite analog. A high silica zeolite is especially preferable since it is considered to be hydrophobic in its pores.

A zeolite in which hetero-atoms other than silicon and oxygen exist in a ratio of 5 or more as a molar ratio of silicon/hetero-atoms is generally called a high silica. In this invention, it is preferable that the aforementioned molar ratio is 10 or more. A more preferable ratio is 30 or more, and especially the more preferable is a ratio of 50 or more. A larger ratio is preferable.

"Pure silica zeolite" refers to a zeolite substantially composed of silica only. Structures that can form such a zeolite include the zeolite structures described in Atlas of Zeolite Structure Types (W. M. Meier, D. H. Olson, Ch. Baerlocher, Zeolites, 17(1/2), 1996). To name them in reference to the structures respectively expressed by three letters, they are zeolites having structures ANA, BIK, BRE, CAN, CAS, CHA, CHI, DAC, DDR, DOH, EAB, EDI, ERI, EUO, FER, GIS, JBW, KFI, LAU, LEV, LTA, MEL, MEP, MER, MFI, MFS, MON, MTN, MTT, NON, PAU, RHO, RON, RTE, RTH, RUT, SGT, THO, TON, VET, WEI and YUG. Among them, structures that allow high silica to be made with ease include zeolites of DDR, DOH, EUO, FER, LEV, MEL, MEP, MFI, MFS, MTN, MTT, NON, RTE, RTH, RUT and TON structures. The most preferable structure is the MFI structure. The reasons for this are that crystallization is easy and that film production is easy.

However, the zeolites of this invention are not limited to these examples. The zeolites that have been newly found after the issue of the above reference document such as CFI (CIT-5) are also included in the zeolites and zeolite analogs of this invention. Of course, in addition to a high silica or pure silica zeolite, a zeolite whose feed-gas-side surface is hydrophobic can be used. For example, a zeolite whose surface became hydrophobic by post-treatment can be used. The treatment to add hydrophobicity is not especially limited, and any generally known methods can be used. For example, treatment by a silicone compound such as a silicone rubber or a silane coupling agent such as an alkylalkoxysilane or alkylchlorinated silane or treatment by a fluorine based water repellency imparting agent can be used. The treatment method is not limited especially. For example, a zeolite membrane is immersed in or brought into contact with a silicone based coating material dispersed or dissolved in a solvent such as water. In the case of a silane coupling, a solution or vapor of a silane coupling agent and a functional layer made of a zeolite can be brought together other for treatment. Above all, a permeable membrane having a functional layer made of a zeolite having the outermost surface layer covered with a silicone compound can be especially preferably used in this invention.

In the case where the functional layer is made of a zeolite, since many OH groups exist on the surface of the zeolite crystal, it can happen that when a hydrophilic liquid such as water, ethylene glycol or γ-butyrolacton contacts the surface of the functional film, for example, a liquid film is formed on the surface without causing gas permeation for a while. However, in the case where the outermost surface is treated thinly with a silicone compound, even if a hydrophilic liquid contacts as described before, it becomes droplets and does not adhere as a liquid film, less affecting the gas permeability. This is an advantage of coating the outermost surface of the functional layer with a silicone compound.

The (2) fine inorganic oxide grains, (3) silicone rubber, silicone resin or silicone oil, (4) organic polymer and (5) carbon used as the other materials of this invention are described later in detail.

Permeable Membrane

The method for producing the permeable membrane of this invention is described below.

The method for coating a porous substrate with a zeolite is not especially limited. In general, a film containing a zeolite or zeolite analog is directly coated on a porous substrate or a porous substrate provided with an intermediate layer, or an organic and/or inorganic polymer film containing a zeolite or zeolite analog is coated. Hereinafter, a porous substrate provided with an intermediate layer is also referred to simply as a porous substrate.

The method for producing a permeable membrane containing a zeolite and others is not especially limited, and any generally known method can be applied. For example, in the case where a porous substrate is coated with a zeolite, applicable are a method comprising immersing a porous substrate in a precursor gel for synthesizing a zeolite and subsequently hydrothermally treating (e.g., JP, 63-291809), a method comprising immersing a porous substrate coated beforehand with a seed crystal of a zeolite in a precursor gel and subsequently hydrothermally treating (e.g., JP, 7-109116, A), a method comprising coating the surface of a porous substrate with a precursor gel, drying and subsequently treating with water vapor (water vapor method) (e.g., JP, 7-89714, A), and a method comprising coating a porous substrate with fine zeolite grains (e.g., JP, 5-50331, B).

A permeable membrane produced by coating the surface of a porous substrate with a precursor gel, drying and treating with water vapor is excellent in view of hydrogen selective permeability and can be preferably used. This method has an advantage that since only a required amount of a precursor is applied onto a porous substrate, the amount of waste liquor is small. However, it has disadvantages that the crystallization rate is low and that the crystal orientation cannot be controlled. The inventors examined to overcome the disadvantages, and as a result, found that the crystallization can be expedited by using a seed crystal.

This invention also includes, a method for producing a membrane containing a zeolite or zeolite analog, comprising the step of treating a membranous substance containing a seed crystal of a zeolite or zeolite analog and silica with water vapor.

The method for producing a permeable membrane containing a zeolite of this invention is characterized by treating a membranous substance containing a seed crystal of a zeolite and silica with water vapor. The seed crystal used is grains containing an entirely or partially crystallized zeolite. It is preferable that the zeolite of the seed crystal is identical with the zeolite to be produced, but even a different zeolite can be used since there can be a case where it can help crystallization. It is estimated that the seed crystal of a zeolite of this invention is effective for shortening the crystallization time, compacting the film and controlling the orientation of the film. It is preferable that the crystal grain size is smaller. In the case where the seed crystal is contained in the pores of the substrate, it is essential that the crystal grain size is smaller than the pore size of the porous substrate.

The crystallization of a zeolite includes two processes; the nuclear production and growth of zeolite crystal. In general, the nuclear production process of a zeolite takes a long time. So, if a seed crystal that can be crystal nuclei is allowed to exist beforehand, the crystallization can be shortened considerably. Furthermore, if the seed crystal is densely laid, the seed crystal grains mutually grow to further promote compaction. Moreover, surprisingly, we have found that if the seed crystal is allowed to exist beforehand, a zeolite membrane with specific orientation can also be produced.

The seed crystal is a zeolite particle produced by an ordinary zeolite particle production method, and it is preferable that the zeolite particles are smaller. The particle size is not especially limited, but is generally 5 $\mu$m or less. Preferable is 1 $\mu$m or less, and more preferable is 0.1 $\mu$m or less. As the seed crystal, commercially available zeolite particles can also be used, but zeolite particles can also be produced by a hydrothermal synthesis method or water vapor method.

To produce the seed crystal, it can be considered to use, for example, a hydrothermal synthesis method in which a slurry, sol or solution of a zeolite precursor is heated to a temperature of 50 to about 250° C. in an autoclave or a water vapor method in which a slurry, sol or solution of a zeolite precursor is pre-dried and exposed to water vapor with a temperature of 50 to about 250 in an autoclave.

The zeolite precursor is a mixture that can be made into a zeolite by such treatment as heating for a certain time, and contains a silica source, alkali source, organic template, water, etc. The zeolite precursor also contains, for example, an alumina source as required. The essential components in this case are a silica source and water, and other components depend on the zeolite to be made.

The silica sources that can be used here include colloidal silica, fumed silica, water glass, precipitated silica, silicon alkoxides, etc. The alkali sources that can be used here include alkali metal hydroxides such as sodium hydroxide, lithium hydroxide and potassium hydroxide.

An organic template is a templating agent of an organic compound that forms the pores of the zeolite. The organic templates that can be used include quaternary ammonium salts such as tetraethylammonium hydroxide, tetrapropylammonium hydroxide and tetrabutylammonium hydroxide, crown ethers, alcohols, etc.

An alumina source is necessary to make a crystalline aluminosilicate zeolite. The alumina sources that can be used include aluminum salts such as aluminum nitrate, aluminum sulfate and aluminum chloride, aluminum hydroxide, aluminum oxide, aluminum alkoxides, etc.

Whether or not a zeolite as a seed crystal has been made can be confirmed by X-ray powder diffractometry, etc. The produced zeolite seed crystal is generally washed with water, dried and calcined, but these operations are not essentially required. It is preferable that these operations are not executed, since the production cost of the zeolite membrane can be reduced.

In this invention, it is preferable that the membranous substance containing a seed crystal of a zeolite and silica is treated with water vapor. The method for producing the membranous substance containing a seed crystal of a zeolite and silica is described below. For example, a seed crystal and a zeolite precursor containing silica are mixed, and the mixture is gelled to obtain a membranous substance. The gelation can be achieved with drying or using a catalyst, etc. The membranous substance can be formed alone or as a coating on a substrate. As another method, a zeolite seed crystal can be press-molded or extrusion-molded into a membranous substance that is then coated with or immersed in a zeolite precursor containing silica.

If the membranous substrate is formed alone, it must have certain strength. However, the membranous substance coated on a porous substrate can have low strength like a liquid film since the porous substrate has the necessary strength. In the case where the membranous substance is coated on a porous substrate, coating with a seed crystal can be followed by coating with a zeolite precursor containing silica, or coating with a zeolite precursor can be followed by coating with a seed crystal of a zeolite. As a further other method, a porous substrate can also be coated with a mixture consisting of a zeolite precursor and a seed crystal.

When the step of coating with a seed crystal is different from the step of coating with a zeolite precursor containing silica, steps of drying and burning can or do not have to intervene between those steps.

In this invention, a zeolite membrane can be used as a functional layer of a permeable membrane. For producing the zeolite membrane, a porous substrate can be used, but a non-porous substrate can also be used for the production.

The method for coating a substrate with a zeolite seed crystal and a zeolite precursor is not especially limited, and any of publicly known methods can be used. For example, it can be considered to use a dip coating method in which a porous substrate is immersed in a slurry and pulled up, a method of coating using a brush or blade, etc., a method of bringing a slurry into contact with one side of the substrate while keeping a reduced pressure on the other side, a method of pressing a slurry onto one side of the substrate by applying a pressure, a spin coating method of adding a coating solution dropwise while revolving the substrate, or a spray coating method of spraying a coating solution to the substrate for coating.

It is preferable in view of membrane strength, pressure resistance and compactness that the seed crystal exists in the pores of a porous substrate, but the seed crystal can simply deposit on the surface of the substrate. The membranous substance containing a zeolite seed crystal and silica formed as described above is treated with water vapor to make a zeolite membrane. Before the treatment with water vapor, it can also be dried as required. The drying in this case means to decrease the water quantity by any method, and for example, even if the membranous substance is allowed to stand at room temperature at atmospheric pressure, it can be dried of course, reduced pressure and raising the temperature can promote the drying. The water vapor treatment is executed usually by bringing water vapor of 50 to 250° C. into contact with the membranous substance containing a zeolite seed crystal and silica. A preferable temperature range is 80 to 200° C. More preferable is 100° C. or higher, and further more preferable is 130° C. or higher. Especially preferable is 145° C. or higher. Generally the treatment is executed in a range from 100 to 200° C.

In the water vapor treatment, water vapor is essential, but a vapor of another compound can also coexist. The vapor of another compound is, for example, the vapor of an amine or alcohol, etc. If the membranous substance of the zeolite membrane contains a quaternary ammonium salt, partial decomposition produces a tertiary amine, etc., and usually the vapor of the tertiary amine exists. Furthermore, the water vapor treatment is executed for a period of time until crystallization is executed, though depending on the kind of the zeolite, the time required depends upon the kind of zeolite precursor containing silica, and upon the temperature.

Whether the zeolite membrane has been formed can be determined with thin layer X-ray diffractometry. Particularly, for example, X-ray diffractometry using CuKα as the X-ray source (wavelength=1.54 angstroms) with the incident angle fixed at 3 degrees at a scanning speed of 2θ 4 degrees/min in a parallel optical system can be executed.

If the obtained X-ray diffraction pattern is compared with the X-ray diffraction pattern in a known document, the zeolite membrane can be identified. Furthermore, if the peak intensity ratios of respective peaks are compared, the orientation of the zeolite membrane can be discussed.

A zeolite membrane is coated on a porous substrate as described above, but the zeolite membrane can be applied with two or more coating operations. Two or more coating operations are preferable in view of compactness.

The method for producing a zeolite membrane of this invention is a novel and industrially useful method, and the produced zeolite membrane is also a novel zeolite membrane in view of orientation. The method for producing a zeolite membrane of this invention can be applied to all kinds of zeolite membranes such as A type, X type, Y type, mordenite, β, and MFI type. For example, if tetrapropylammonium ions are allowed to exist in the zeolite precursor, an MFI zeolite is likely to be produced. The MFI zeolite membrane (after burning at 550° C.) obtained according to the production method of this invention satisfies the following two conditions in the diffraction pattern obtained by thin layer X-ray diffractiometry using CuKα as the X-ray source (wavelength=1.54 angstroms) with the incident angle fixed at 3 degrees at a scanning speed of 2θ 4 degrees/min in a parallel optical system $$a/b=0.3 \text{ to } 1.5 \tag{1}$$

$$b/c>4.4 \tag{2}$$

where a is the maximum peak intensity within a 2θ range of 7.3 to 8.0 degrees, b is the maximum peak intensity within a 2θ range of 8.5 to 9.1 degrees, and c is the maximum peak intensity within a 2θ range of 13.0 to 14.2 degrees.

As a result of a permeation experiment, it was found that an MFI zeolite membrane with such orientation shows excellent performance in permeability and permeation selectivity.

The reason is not clear at this moment but can be considered to be as described below. The maximum peak in a 2θ range of 8.5 to 9.1 degrees expresses the peak of (200) plane or (020) plane. An MFI zeolite has pore inlets on the (100) plane and the (010) plane, and does not have pore inlets on the (001) plane. Therefore, a larger value of the maximum peak intensity b within a 2θ range of 8.5 to 9.1 degrees expresses a larger number of pore inlets on the membrane surface and should indicate excellent performance. The maximum peak within a 2θ range of 7.3 to 8.0 degrees expresses the peak of the (−101) plane or the (011) plane, and the value of a/b can express how many zeolite pore inlets exist on the membrane surface. In the X-ray powder diffraction diagram of an ordinary MFI zeolite, a/b is about 1.9, and if a/b is smaller than that value, it can be said that excellent orientation is indicated from the viewpoint of permeability. Furthermore, a peak within a 2θ range of 13.0 to 14.0 degrees expresses the peak of the (002) plane or the (012) plane. That is, if the peak is large, that means that a face free from pore inlets appears more on the membrane surface, which is not preferable as for a permeable membrane. Therefore, a larger b/c value expresses that more pore inlets appear on the membrane surface preferably as a permeable membrane. In the X-ray powder diffraction diagram of an ordinary MFI zeolite, the b/c value is about 4.3, and it can be said that a b/c value larger than that value is preferable for orientation. However, if the orientation is too perfect, there is no relief against stresses due to, for example, heat history, and it can be expected that the membrane will become sensitive, for example, to temperature changes and may be cracked during calcination. So, it is desirable that the orientation is imperfect to some extent. Therefore, it is preferable that the b/c value is 4.4 to about 13. A more preferable range is 5 to 11. This applies also to a/b, and it is preferable in view of permeability that a/b is 1.5 or less, but in view of the strength of the membrane against, for example, temperature changes, it is considered desirable that a/b is 0.3 or more. A preferable a/b range is 0.5 to 1.3.

The thickness of the zeolite membrane is not especially limited, but it is preferable that the thickness is thinner, say, 3 μm or less.

The produced zeolite membrane can also be treated with washing with water, drying and calcining. Whether or not the zeolite membrane has been formed can be confirmed by using an X-ray diffractometer for thin films. In the case where the produced zeolite membrane is calcined, it should be heated as slowly as possible lest the produced zeolite membrane should be cracked. It is preferable that the heating rate is 3° C./min or lower. More preferable is 2° C./min or lower, and especially preferable is 1° C./min or lower. Of course, it is desirable that the cooling rate is also lower. It is preferable that the cooling rate is 5° C./min or lower. More preferable is 3° C./min or lower, and especially preferable is 2° C./min or lower. The calcining temperature is generally about 150 to 600° C.

In the case where the permeable membrane containing a zeolite is made into a composite membrane with an inorganic and/or organic polymer, a zeolite is made beforehand by a hydrothermal synthesis method or a water vapor method, and the grains of the zeolite are mixed with the polymer, then the mixture being formed into a membrane. The method for producing the permeable membrane containing a zeolite is not limited to the above, and it is only required that the zeolite is mixed in the polymer. As another method, a formed zeolite membrane can be coated with the polymer. The polymer to be mixed is not especially limited, and can be, for example, a silicone rubber, polysulfone polymer or phenol resin, etc.

It is desirable that the permeable membrane containing a zeolite is as small as possible in the number of pores other than those in the crystal of the zeolite. The treatment for reducing the number of pores other than those in the crystal is called a compaction treatment. Since it is desirable that the number of pores (clearances between crystal grains) outside the crystal is as small as possible, it is preferable to apply a compaction treatment to the permeable membrane. Of course, if a compact membrane is formed already even without the compaction treatment, it is not necessary to execute the compaction treatment. As the compaction treatment method, any of publicly known methods can be used. For example, the permeable membrane is impregnated with an organic compound having a size that cannot go into the pores of the zeolite but can go into the other pores such as the pores formed in the grain boundaries between crystal grains, and is burned in a gas substantially free from oxygen such as nitrogen gas, to be carbonized for filling the pores. However, this invention is not limited to this method.

As other methods, the membrane can be treated, for example, with a phenol resin likely to be carbonized, and heated, to fill the pores other than those of the crystal, or a composite membrane with carbon can also be formed. A compound such as a silicone compound or a silane coupling agent such as an alkylalkoxysilane, alkylchlorosilane or alkoxysilane can also be caused to fill the pores formed in the grain boundaries, or a composite membrane with such a compound can also be formed.

In the case where the zeolite is a high silica and/or pure silica zeolite, a permeable membrane, in which the difference between the hydrogen permeation rate of the permeable membrane at room temperature after burning and the hydrogen permeation rate at room temperature immediately after keeping the permeable membrane in contact with 85 ethylene glycol saturated vapor for 24 hours at 85 is $2 \times 10^{-7}$ mol/m$^2$·s·Pa or less, is especially preferable. The reason is considered to be that the permeable membrane with this property is highly compact. Ethylene glycol is hydrophilic and is not adsorbed in the pores of the hydrophobic high silica and/or pure silica zeolite.

On the other hand, it is considered that the mesopores (10 to 100 angstroms) in boundaries between zeolite crystal grains cause capillary condensation. Therefore, a permeable membrane, in which the difference between the hydrogen permeation rate of the permeable membrane at room temperature after calcining and the hydrogen permeation rate at room temperature immediately after keeping the permeable membrane in contact with 85° C. ethylene glycol saturated vapor for 24 hours at 85° C. is smaller, is estimated to be more compact preferably. In this case, "after calcination" means "after calcination and removing the organic substance adsorbed or introduced in the pores of the zeolite", and in the case where there is no such organic substance, calcination is not required. Usually, the calcination is executed in a range of 150 to 600° C. Lower heating and cooling rates are preferable as described before. After calcination, the temperature is returned to room temperature, and the membrane is brought into contact with hydrogen of 2 atmospheric pressure (0.2M Pa), to measure the hydrogen permeation rate. Then, it is kept in contact with 85° C. ethylene glycol vapor for 24 hours at 85° C., and immediately brought into contact with hydrogen of 2 atmospheric pressure (0.2M Pa), to measure the hydrogen permeation rate. A permeable membrane smaller in the difference of both the hydrogen permeation rates is preferable.

It can happen that a zeolite or zeolite analog has ion exchange sites. The cations that are exchanging at the ion exchange sites are not especially limited. All cations such as H$^+$, Li$^+$, Na$^+$, K$^+$, Pb$^+$, Cs$^+$, Ca$^{2+}$, Mg$^{2+}$, Ba$^{2+}$, Ag$^+$, Cu$^2$+, Cu$^+$, Ni$^{2+}$ and La$^3$+ can exchange, and any of the cations can be exchanged at the ion exchange sites.

The functional layer in this invention can also be an aggregate of fine grains of an inorganic oxide only. This is a permeable membrane positively using the fine pores formed as the clearances between fine grains, unlike a zeolite or zeolite analog. If the fine grains are smaller in size, the pore size of the permeable membrane becomes smaller preferably for permeation selectivity. In this invention, it is preferable that the functional layer formed by an inorganic oxide has micropores (less than 20 angstroms). The method for forming a functional layer using the fine grains of an inorganic oxide is not especially limited, and a method of coating or immersing a porous substrate with or into, for example, a colloid or slurry having fine grains of an inorganic oxide dispersed, or a method of depositing the fine grains of an oxide on the porous substrate by chemical vapor deposition can be used. The porous substrate, compaction treatment and hydrophobic treatment are the same as described for the above-mentioned functional layer of a zeolite or zeolite analog. Composite formation with another functional layer of, for example, a zeolite, silicone compound, organic polymer compound or carbon can also be preferably adopted.

A silicone rubber and/or a silicone resin and/or a silicone oil can also be used as a material of the functional layer of the permeable membrane of this invention. Especially, a material containing a silicone rubber can be preferably used.

The silicone in this invention refers to an organic silicone polymer compound having siloxane bonds as a structural skeleton and having, for example, organic groups bonded to the silicon atoms thereof. A silicone rubber is one of materials made of a silicone, obtained by crosslinking a linear polyorganosiloxane with a high polymerization degree to a medium degree to provide rubbery elasticity, and is also called a silicone elastomer. A silicone rubber is excellent also in heat resistance and chemicals resistance compared with organic resins, and can also be used for high temperature applications of higher than 150° C. Silicone rubbers can be classified variously in view of their properties. In view of vulcanization temperature, they can be classified into heat curing type, low temperature curing type and room temperature curing type.

A heat vulcanizing type silicone rubber must be heated at higher than the decomposition temperature of a peroxide vulcanizing agent at the time of vulcanizing, and only after such heating, a silicone with rubbery elasticity can be obtained. The raw material of a heat vulcanizing type silicone rubber is mainly solid and is called a millable rubber, but is not always solid.

On the contrary, a low temperature curing type silicone rubber is liquid or pasty, and is long in the pot life at room temperature after adding a curing agent, being excellent in working convenience. Furthermore, when cured, it does not require a high temperature required for the heat curing type silicone rubber, and if heated at 100 to 150° C., it can be quickly cured.

A room temperature curing type silicone rubber causes curing reaction at room temperature literally, to be a silicone rubber having rubbery elasticity. A room temperature curing type silicone rubber is also liquid or pasty, before being cured. The difference between these types in curing temperature is attributable to the polymerization degree of the polyorganosiloxane in the raw material, additives, filler and the kind and quantity of the crosslinking agent. The silicone rubber used in this invention is not especially limited in type, but in view of working convenience, a low temperature curing type silicone rubber or a room temperature curing type silicone rubber can be preferably used.

A silicone rubber can also be a generally called silicone resin. A silicone resin is a hard material very higher in crosslinking density compared with the above three types of silicone rubbers. Silicone resins can be roughly classified into straight silicone resins and silicone-modified organic resins. A straight silicone resin is composed of a silicone only, and a silicone-modified organic resin is a copolymer consisting of a silicone and an organic resin. Depending on the required permeation quantity, a silicone resin can also be used.

The silicone rubber curing mechanisms can be roughly classified into condensation reaction type and addition reaction type. In the condensation reaction type, a condensation reaction is caused with the moisture in air, to cause curing. On the other hand, the addition reaction type is mainly a hydrosilylation reaction, and does not produce any by-product.

A membrane formed from such a silicone compound allows good permeation of, for example, hydrogen compared with a membrane formed from any other polymer compound, but is low in hydrogen permeation rate compared with porous membranes such as the above-mentioned zeolite membrane and fine oxide grain membrane. The reason is considered to be that a silicone membrane and an organic polymer membrane described later allow permeation by dissolved diffusion of molecules into a polymer, and that the resistance during permeation of molecules is large compared with that of a porous membrane. Therefore, to obtain a desired permeation quantity, it is preferable that the functional layer is thinner. However, care should be exercised since the selectivity declines conversely if the thickness is too thin. The thickness of the membrane is not especially limited, but a thickness range of 0.1 to 500 $\mu$m is preferable. The preferable membrane thickness is various, depending on the application. For the application onto an electrolytic capacitor, a range of about 0.1 to 200 $\mu$m is preferable. A more preferable range is 0.5 to 150 $\mu$, and an especially preferable range is 1 to 100 $\mu$m. Such a thin membrane per se does not have a practical strength. So, in this invention, such a functional layer is coated on a porous substrate. The style and the method of use of the porous substrate are as described before.

In this invention, the ingredients of the raw solution of the silicone rubber are not especially limited, but, for example, the following ingredients can be used. With any silicone rubber, a polyorganosiloxane (silicone polymer) is used as a main raw material, and a reinforcing filler such as dry process silica or wet process silica, an extending filler such as diatomaceous earth or quartz powder, various additives and a crosslinking agent are added to an organic solvent as a preferably applied method. The organic solvent used here is not especially limited as far as it allows the above raw materials to be dissolved or highly dispersed. As the organic solvent, toluene, xylene, n-heptane, ligroin, isopropyl alcohol or a mixture thereof can be preferably used. The molecular structure of the polyorganosiloxane is not especially limited, but a structure having a methyl group, phenyl group, vinyl group or trifluoropropyl group bonded to silicon can be preferably used. Furthermore, the polymerization degree of the raw polymer is not especially limited either, but in view of simple coating work, a polymerization degree of 10000 or less is preferable.

The method for coating a substrate with a silicone rubber is not especially limited, and for example, the following methods can be used. That is, the raw solution of a silicone rubber is prepared, and a porous substrate is coated with it. As another method, the porous substrate is immersed in the raw solution of a silicone rubber, or one side of a porous substrate is brought into contact with the raw solution of a silicone rubber, while suction is executed on the side opposite to the side to be coated with the silicone rubber. After the silicone rubber solution is carried on the porous substrate using any of these methods, it can be treated for curing the silicone rubber. For the treatment, it is preferable to allow the silicone rubber coating to stand in air at room temperature for 10 minutes to 1 week, or to heat it at lower than 200° C. and to allow it for 10 minutes to 1 week.

An organic polymer compound or carbon obtained by carbonizing it is also effective as the functional layer. The organic polymer compounds that can be preferably used here include polyimides, polytetrafluoroethylene, butylene rubber, isobutylene rubber, polypropylene and phenol resins. As for the carbon, carbon obtained by calcining, for example, a polyimide or polyphenol in vacuum, nitrogen current, inactive gas or air for carbonization can be preferably used. An organic polymer compound membrane is a nonporous membrane like the above-mentioned silicone membrane, and is poor in hydrogen permeability compared with a porous membrane. So, it is preferable that the membrane thickness is thinner. It is preferable that the membrane thickness is 100 $\mu$ or less, especially 10 $\mu$ or less. For coating a porous substrate with an organic polymer compound, the polymer compound can be molten or dissolved into a solvent for coating, immersion or spraying, etc., but the method is not limited thereto.

Furthermore, to obtain carbon, a substrate is coated with an organic polymer compound or organic matter likely to be carbonized, and it is burned in vacuum, nitrogen, inactive gas or air. Among various types of carbon, a porous carbon molecular sieve having pores as small as molecular size is especially preferable. Compounds that can be carbonized into carbon molecular sieves include polyimides, phenol resins, etc., but are not limited thereto. The functional layer of an organic polymer compound or carbon can be used alone, but composite formation with another functional layer is also preferable.

The permeable membrane of this invention has a hydrogen permeation rate of $1 \times 10^{-10}$ mol/m$^2$·s·Pa or more. If the permeation rate is lower than $1 \times 10^{-10}$ mol/m$^2$·s·Pa for example in the case where the permeable membrane is applied as an electrolytic capacitor described later, the quantity of the hydrogen gas generated in the electrolytic capacitor becomes larger than the quantity discharged through the permeable membrane outside the electrolytic capacitor. As a result, the hydrogen pressure in the electrolytic capacitor rises to break the electrolytic capacitor. So, the hydrogen permeation rate must be $1 \times 10^{-10}$ mol/m$^2$·s·Pa or more, and preferable is $1 \times 10^{-9}$ mol/m$^2$·s·Pa or more. Also for other applications than electrolytic capacitor, a higher permeation rate is more practical, and a permeable membrane with a hydrogen permeation rate of $1 \times 10^{-10}$ mol/m$^2$·s·Pa or more is very useful.

The upper limit of the permeation rate is not especially limited, but it is preferable that the permeation rate is lower than $5 \times 10^{-6}$ mol/m$^2$·s·Pa. The reason is that if the permeation rate is higher than $5 \times 10^{-6}$ mol/m$^2$·s·Pa, not only hydrogen but also other ingredients permeate well, reducing selectivity.

As the method for evaluating the hydrogen permeation rate, for example, a hydrogen gas of 2 atmospheric pressure (0.2M Pa) is supplied to one side of a 1 cm$^2$ permeable membrane at room temperature, and the quantity of the gas coming out on the other side of the membrane is measured using a soap film flow meter. If this method is used, the permeation rate in the case where 1 cc of hydrogen gas per second permeates is $4.5 \times 10^{-6}$ mol/m$^2$·s·Pa.

The most preferable method for measuring the hydrogen gas permeation rate of the permeable membrane used for an electrolytic capacitor is to feed 65 vapor of ethylene glycol together with hydrogen of 2 atmospheric pressure (0.2M Pa) to the permeable membrane kept at 65° C., and to measure the flow rate of the hydrogen gas coming out after permeation through the permeable membrane. If the hydrogen permeation rate measured like this is in the above range, it is especially preferable. In the case of measurement in the presence of ethylene glycol vapor like this, it can happen that the hydrogen permeation rate declines greatly in the beginning, but it reaches a constant value before long. The hydrogen permeation rate that has reached the constant value is the hydrogen permeation rate referred to here.

The permeable membrane of this invention satisfies at least one of the following conditions:

(1) Hydrogen is selectively permeated rather than water vapor.

(2) When a test tube containing ethylene glycol and sealed with said permeable membrane is placed in a 85° C. oven, the ethylene glycol decrease rate measured is $1 \times 10^{-2}$ g/hour or less per 1 cm$^2$ of the permeable membrane.

(3) When a test tube containing 5% ammonium adipate solution in ethylene glycol and sealed with said permeable membrane is placed in a 85° C. oven for 2 days, the acid quantity of the solution is $5 \times 10^{-3}$ equivalent or less per 1 cm$^2$ of the permeable membrane.

That hydrogen is selectively caused to permeate rather than water vapor means that when a mixed gas consisting of hydrogen and water vapor is permeated through the permeable membrane, the ratio of hydrogen to water in the mixed gas obtained after permeation is higher than the ratio of hydrogen to water in the supplied mixed gas. For evaluation, a gas of 2 atmospheric pressure (0.2M Pa) containing water vapor having saturated vapor pressure at room temperature and hydrogen is brought into contact with the permeable membrane of this invention, with the opposite side of the membrane kept at atmospheric pressure (0.1M Pa), for permeation by a differential pressure of 1 atmospheric pressure, and the water and hydrogen in the supplied gas and those in the gas obtained after permeation are analyzed by gas chromatography. If the hydrogen quantity and the water quantity in the supplied gas analyzed by gas chromatography are respectively A and B, and the hydrogen quantity and water quantity of the gas obtained after permeation are respectively C and D, then C/D>A/B means that hydrogen is selectively permeated rather than water vapor. That is, to obtain a value of CB/AD>1 is an essential condition of this permeable membrane. The value of CB/AD is defined as the selective permeation coefficient of hydrogen, and it is desirable that the value is larger, preferably 2.0 or larger. More preferable is 2.5 or larger, and practically desirable is 3 or larger. Substantially, desirable is 5 or larger, and preferable is 10 or larger. It is especially preferable that the value is 100 or larger. If the value is larger, the application range is wider, and the performance in the application becomes higher. The permeable membrane of this invention is a membrane for causing the selective permeation of hydrogen from a mixed gas consisting of water vapor and hydrogen, and the mixed gas can contain any other gas, if hydrogen is selectively permeated rather than water vapor. For example, in an application for fuel cells, if hydrogen is selectively caused to permeate rather than carbon monoxide in the presence of water vapor, it is more preferable.

It is desirable that the permeable membrane of this invention is not only higher than a certain value in hydrogen permeation rate but also lower than a certain value in ethylene glycol permeation rate. The ethylene glycol permeation rate can be measured according to the following method. A test tube containing ethylene glycol and sealed with the permeable membrane is placed in a 85 oven, and the ethylene glycol decrease rate is measured as the permeation rate. It is preferable that the permeable membrane of this invention has an ethylene glycol permeation rate of $1 \times 10^{-2}$ g/hour or less per 1 cm$^2$ of the permeable membrane. It is preferable that the value is smaller, and more preferable is $2 \times 10^{-3}$ g/hour or less. The test tube can be sealed with the permeable membrane, for example, by using a two-component type epoxy resin adhesive for bonding.

It is desirable that the permeable membrane of this invention is not only higher than a certain value in hydrogen permeation rate but also unlikely to allow the permeation of ammonia gas. To evaluate the unlikelihood of ammonia permeation, the following means is used. That is, a test tube containing 5% ammonium adipate solution in ethylene glycol and sealed with the permeable membrane is placed in a 85 oven for 2 days, and the acid quantity of the solution is determined by titration. It is desirable that the value is $5 \times 10^{-3}$ equivalent or less per 1 cm$^2$ of the permeable membrane. The test tube can be sealed with the permeable membrane, for example, by using a two-component type epoxy resin adhesive for bonding. This measuring method is described in detail in the examples described later.

There are many applications in which a gas is allowed to permeate or is separated in the presence of polar molecules of water, ammonia or ethylene glycol, etc. A membrane that has not only a capability to allow the permeation of a gas but also a nature of being unlikely to allow the permeation of polar molecules as stated above can be used for various applications. For example, it can be used widely for separating nitrogen and oxygen from air containing water vapor, refining hydrogen from a hydrogen gas containing water vapor, separating the hydrogen gas and carbon monoxide obtained in the steam reforming of methane or methanol in a fuel cell, removing the dissolved gas in a polar solvent such as water, and also for an electric capacitor described later.

This invention includes an electrolytic capacitor containing the permeable membrane of this invention. The permeable membrane of this invention comprises, as described before, a porous substrate and a functional layer, and has a hydrogen permeation rate of $1\times10^{-10}$ mol/m$^2$·sec·Pa or more and also satisfies at least one of the following conditions:

(1) Hydrogen is selectively allowed to permeate rather than water vapor.
(2) When a test tube containing ethylene glycol and sealed with said permeable membrane is placed in an 85° C. oven, the ethylene glycol decrease rate measured is $1\times10^{-2}$ g/hour or less per 1 cm$^2$ of the permeable membrane.
(3) When a test tube containing 5% ammonium adipate solution in ethylene glycol and sealed with said permeable membrane is placed in an 85° C. oven for 2 days, the acid quantity of the solution is $5\times10^{-3}$ equivalent or less per 1 cm$^2$ of the permeable membrane.

An electrolytic capacitor using the permeable membrane of this invention is described below.

If the permeable membrane of this invention is used in an electrolytic capacitor, the container of which contains overlaid anode and cathode foils, an anode terminal and a cathode terminal protruding at their ends on one side outside the container, and an electrolyte, the permeable membrane allows the permeation of the hydrogen gas generated in the capacitor and does not allow the permeation of the electrolyte as a liquid or vapor. Therefore, since the internal pressure does not rise and the composition of the electrolyte does not greatly change, this invention is very effective for life extension and performance stability of the capacitor.

The electrolytic capacitor of this invention has an especially excellent effect particularly in the case where the electrolyte is a liquid, though not specifically limited thereto. This invention is especially effective for an aluminum electrolytic capacitor, above all, a large size screw-threaded terminal type aluminum electrolytic capacitor.

Figure 2:
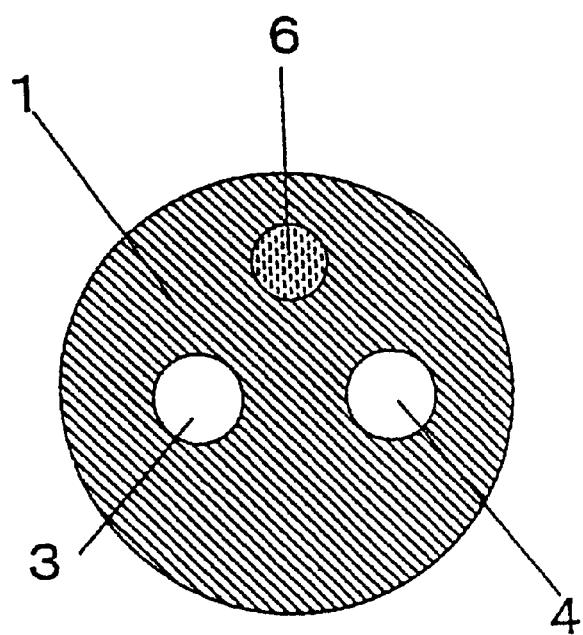
FIG. 2 is a schematic plan view of the sealing plug portion of the electrolytic capacitor of FIG. 1, viewed from above.

The electrolytic capacitor of this invention is described below in reference to drawings. FIG. 1 is a schematic cross sectional view showing an example of the electrolytic capacitor using the permeable membrane of this invention. FIG. 2 is a schematic plan view showing a sealing plug portion of the electrolytic capacitor of FIG. 1 viewed from above.

In FIG. 1, an electrolytic capacitor element 2 formed by winding an anode foil and a cathode foil with kraft paper interposed between them is impregnated with an electrolyte, and housed in an aluminum container 5, with an anode terminal 3 and a cathode terminal 4 protruded from the through holes of a sealing plug 1. FIG. 2 is a view showing the sealing plug 1 of FIG. 1 viewed from above. The permeable membrane 6 of this invention can be installed, for example, at a position of 6 in FIG. 2 using, for example, an adhesive.

Since the permeable membrane of this invention allows the permeation of hydrogen but is unlikely to allow the permeation of water, the water vapor and the water, ethylene glycol and γ-butyrolactone as main ingredients of the electrolyte are unlikely to permeate. So, the chemical composition of the electrolyte does not change, and the hydrogen generated by electrolysis can be released outside, to prevent the bursting of the capacitor and to allow the performance to be stabilized for a long period of time.

As for the style of the permeable membrane used in this invention, a plate-like permeable membrane can be preferably used. Furthermore, the form of the permeable membrane is not especially limited, and the size is only required to be smaller than the sealing plug. However, it is preferable that the size of the permeable membrane is smaller than the radius of the sealing plug. The thickness of the permeable membrane is not especially limited, and it is only required that the permeable membrane is mechanically strong enough not to be broken when installed.

This invention also includes, an electrolytic capacitor, in which a permeable membrane having an inorganic porous substrate and a functional layer is installed in a sealing plug with an elastic body intervening between the permeable membrane and the sealing plug. As described before, the permeable membrane of this invention uses a porous substrate. Above all, an inorganic porous substrate can be preferably used.

In general, an electrolytic capacitor is mounted with a pressure valve made of rubber such as a silicone at the sealing plug portion, and since it is an elastic body, it can be easily fitted in the sealing portion with good adhesion. However, in the case of a permeable membrane having a rigid (high elastic modulus) porous substrate as in this invention, it is difficult to fit the permeable membrane in the sealing plug made of a resin with good adhesion. It is possible to bond the permeable membrane to the sealing plug using, for example, an adhesive, but it is inconvenient and inpractical.

As a method for improving the installation inconvenience, it was found that the permeable membrane could be installed in the sealing plug of the electrolytic capacitor by using an elastic body around the rigid permeable membrane. Thus, the subject matter of this invention has been arrived at. The elastic body used here is not especially limited, but a product made of, for example, a silicone rubber, natural rubber or butylenes rubber is preferable. For example, an O ring or tube made of rubber is fitted around a cylindrical ceramic plate-like porous support coated with a functional layer, and the permeable membrane having the rubber O ring or tube attached around it is fitted in a portion formed beforehand in the sealing plug for fitting it. As other methods, it can be considered that two O rings are used to hold the plate-like permeable membrane from both sides, or that an O ring and a spring are used for holding it from both sides.

The application of the permeable membrane or MFI zeolite membrane (hereafter may be called an MFI membrane) of this invention is not limited to an electrolytic capacitor. For example, the permeable membrane can also be used as a hydrogen permeable membrane for fuel cells. Fuel cells are expected as future batteries for motor vehicles, and the fuel is hydrogen. As one method for supplying hydrogen, methanol is supplied to the fuel tank of a motor vehicle, and it is reformed into hydrogen and carbon dioxide using water vapor and a catalyst. In this case, carbon monoxide is produced as a by-product, and if the permeable membrane or MFI membrane of this invention is used, it allows the permeation of hydrogen very selectively without being disturbed by unreactive water vapor.

The permeable membrane of this invention can also be used for separating various gases and liquids. Therefore, this invention also includes, "a method for separating at least one kind of molecules by bringing a gas or liquid mixture consisting of at least two kinds of molecules into contact with the permeable membrane of this invention, for allowing the permeation of at least one kind of molecules". For example, this invention includes a separation method, in which a dilute alcohol aqueous solution is brought into contact with the permeable membrane of this invention, to allow selective permeation of an alcohol, for obtaining a highly concentrated alcohol.

EXAMPLES

This invention is described below in more detail in reference to examples. The following examples are illustrative, and in any sense, they should not be interpreted to limit this invention.

Example 1

Synthesizing a Seed Crystal for Synthesizing a Silicalite Membrane

Zero point two eight gram (0.28 g) of sodium hydroxide (first class grade chemical produced by Katayama Kagaku) was added to 20 g of 20~25% aqueous solution of tetrapropylammonium hydroxide (TPAOH), and the mixture was stirred. Furthermore, 5 g of fumed silica (Aldrich) was added to it, and the mixture was heated at 80° C., to obtain a transparent aqueous solution. It was placed in a polytetrafluoroethylene line autoclave, and heated at 125° C. for 8 hours, to obtain fine silicalite grains (average grain size about 80 nm). To them, water was added, to make a silicalite colloid containing 8% of silicalite.

Example 2

Coating a porous Substrate With a Seed Crystal

Zero point one gram (0.1 g) of the 8% silica colloid obtained in Example 1 was added dropwise to the surface treated with fine alumina grains, of a square α-alumina porous substrate having a side length of 1.4 cm and a thickness of 3 mm (a ceramic membrane (100 mm×100 mm×3 mm) coated with fine alumina grains to have a thickness of about 50 μm only on one side and having an average pore size of 0.1 μm) produced by NGK INSULATORS LTD., cut to the above size, as uniformly as possible for coating, and the coated substrate was dried and calcined at 550° C. for 3 hours, to obtain a substrate coated with a seed crystal.

Example 3

Synthesizing a Silicalite Membrane by Hydrothermal Synthesis

The substrate coated with a seed crystal obtained in Example 2 was placed in a gel with a composition of 40 $SiO_2$ (Aldrich fumed silica): 12 TPAOH (tetrapropylammonium hydroxide): 16800 $H_2O$, and heated in an autoclave at 130 for 24 hours. It was confirmed by X-ray diffraction and electron microscope that an about 2-micron silicalite membrane was formed on the porous substrate. The sample membrane was calcined at 550 for 2 hours. The heating rate for the calcination was set at 0.6° C./min and the cooling rate was set at 1.2° C./min. With X-ray diffraction and electron microscope observation, it was confirmed that a thin silicalite membrane was formed on the porous substrate.

Example 4

Preparing a Cell for Permeability Measurement

Figure 3:
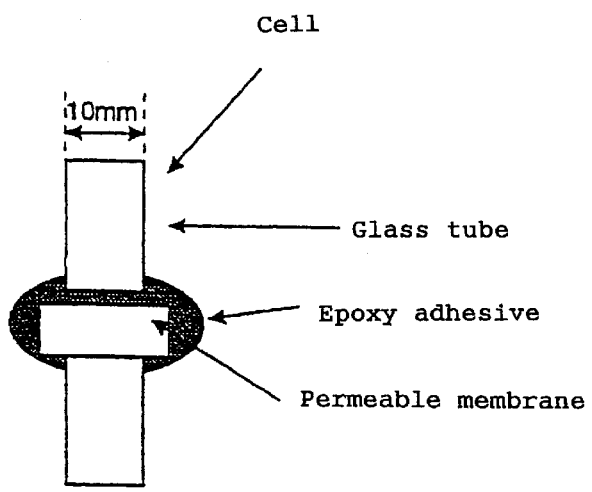
FIG. 3 is a schematic side elevation for illustrating a cell for measuring the permeability of the permeable membrane of this invention.

The permeable membrane obtained in Example 3 was held between glass tubes with an inner diameter of 10 mm as shown in FIG. 3, and they were bonded using a two-component type epoxy resin adhesive. Furthermore, the component was covered with the same adhesive as shown in FIG. 3, to make a permeation cell having a permeable area of 0.785 $cm^2$.

Example 5

Figure 4:
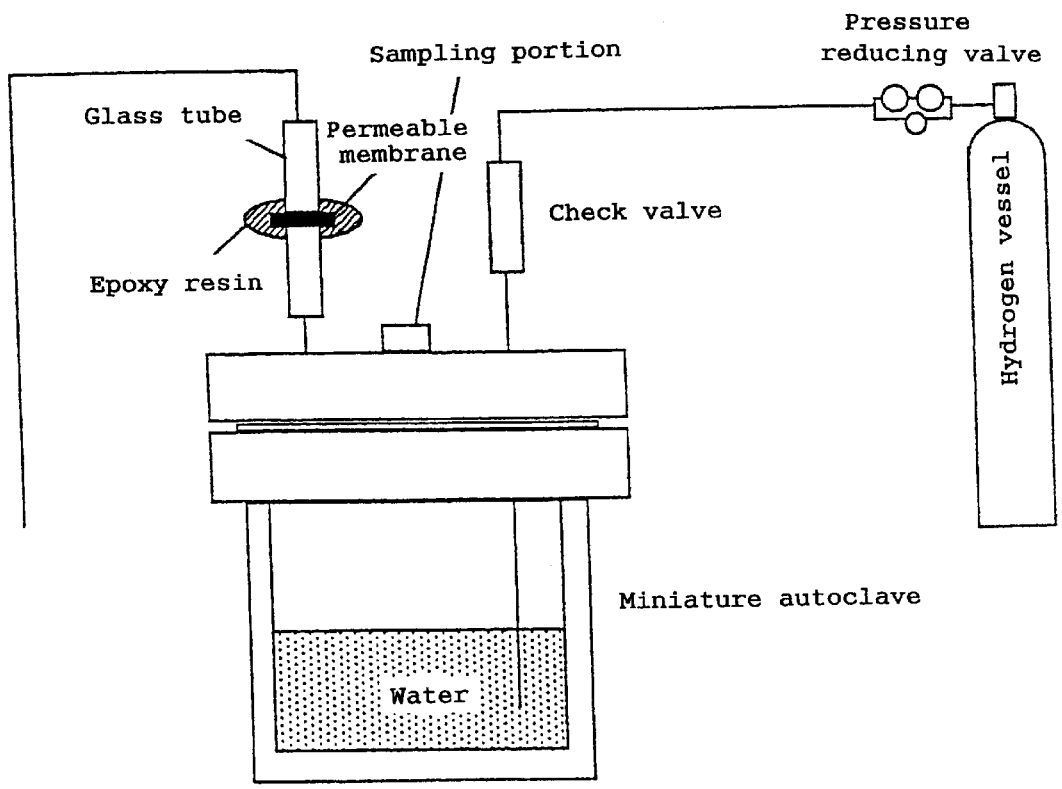
FIG. 4 is a schematic side elevation for illustrating an apparatus for examining the hydrogen/water vapor permeation characteristics of the permeable membrane of this invention.

Measuring the Hydrogen Permeation Rate in the Presence of Water Vapor and Measuring the Hydrogen Selective Permeability The permeation cell prepared in Example 4 was installed in the permeation apparatus of FIG. 4 (installed with the functional layer on the autoclave side), and a gas of 2 atmospheric pressure (0.2M Pa) containing water vapor having saturated vapor pressure at room temperature and hydrogen was kept in contact with the permeable membrane of this invention, and the opposite side of the permeable membrane was kept at atmospheric pressure (0.1M Pa). In this state, the gas was caused to permeate at a differential pressure of about 1 atmospheric pressure (0.1M Pa). The water and hydrogen gas in the supplied gas and those in the gas coming out after permeation through the membrane were analyzed by gas chromatography. With the hydrogen quantity and the water quantity in the supplied gas analyzed by gas chromatography as A and B respectively, and with the hydrogen quantity and the water quantity coming out of the membrane as C and D, the ratio of CB/AD was obtained.

Example 6

Permeation Characteristics of the Permeable Membrane of Example 3

According to the method of Examples 4 and 5, the permeation characteristics of the permeable membrane obtained in Example 3 were evaluated. As a result, CB/AD was 1.9, and the hydrogen permeation rate was $2.0 \times 10^{-7}$ mol/s·$m^2$·Pa. Furthermore, it was confirmed that the hydrogen permeation rate remained constant for more than 4 hours after passage of 4 hours following the start of the experiment.

Example 7

Figure 6:
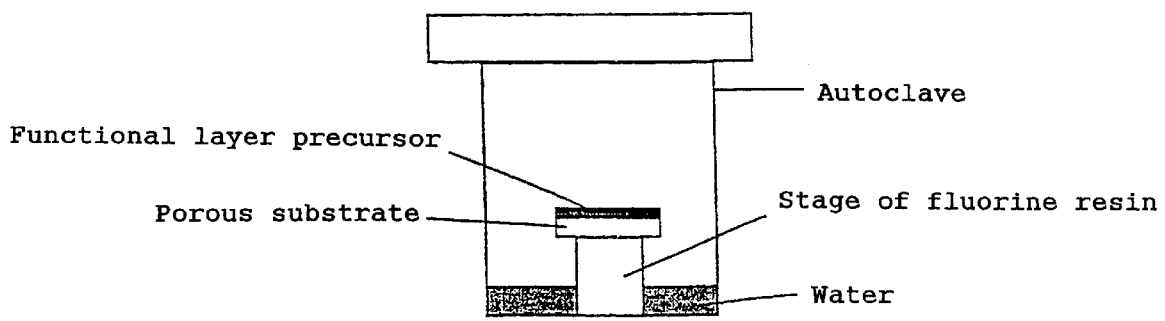
FIG. 6 is a schematic drawing for illustrating a process for producing a silicalite membrane by the water vapor method of this invention.

Producing a Silicalite Membrane According to a Water Vapor Method and Evaluating It Zero point one gram of a gel with a composition of 40 $SiO_2$: 12 TPAOH (tetrapropylammonium hydroxide): 430 $H_2O$ was added dropwise to the surface coated with silicalite grains (functional layer precursor), of the porous substrate coated with a seed crystal obtained in Example 2, and the coated substrate was dried at room temperature overnight, to make a sample membrane. As shown in FIG. 6, 0.5 g of water was placed in a 50 ml autoclave, and the sample membrane was placed on a polytetrafluoroethylene stage that was placed in the autoclave and heated at 150° C. under autogenous pressure of water vapor for 5 days (hereinafter this treatment is called water vapor treatment). The sample membrane was washed with water and dried, and it was confirmed with X-ray diffraction and electron microscope that a thin silicalite membrane was formed on the porous substrate. Then, the sample membrane was burned at 550° C. for 2 hours. The heating rate for the burning was set at 0.60° C./min and the cooling rate was set at 1.2° C./min. As a result of X-ray diffraction and electron microscope observation, it was confirmed that a thin silicalite membrane was formed on the porous substrate still after burning.

Furthermore, according to the method of Examples 4 and 5, the permeation characteristics achieved were evaluated. The ratio CB/AD was 2.8, and the hydrogen permeation rate was $4.4 \times 10^{-7}$ mol/s·m·Pa. Moreover, it was confirmed that the hydrogen permeation rate remained constant for more than 4 hours after passage of 4 hours following the start of the experiment. Both the permeation rate and selectivity were better, when compared to the membrane prepared according to hydrothermal synthesis.

Example 8

Treatment for Making the Silicalite Membrane Hydrophobic

The permeable membrane obtained in Example 7 was treated on the surface with trimethylchlorosilane (PRX24 produced by Toray Dow Corning Silicone). After the surface of the permeable membrane was immersed in PRX24, it was allowed to stand at room temperature for 1 day, and sufficiently dried at 120° C. According to the method of Examples 4 and 5, the permeation characteristics were evaluated. The CB/AD ratio was 5.0 showing a higher selectivity. This is considered to be because the surface of the permeable membrane was made hydrophobic.

Example 9

Method for Producing a Silicalite Membrane According to a Water Vapor Method

The colloid obtained in Example 1 was diluted with water, to obtain 1% colloid solution, and 9 g of the colloid solution was brought into contact with the surface treated with fine alumina grains, of a square α-alumina porous substrate having a side length of 1.4 cm and a thickness of 3 mm (produced by NGK INSULATORS LTD., coated with fine alumina grains to have a thickness of about 50 μm on one side only and having an average pore size of 0.1 μm), and was caused to adhere to the porous substrate by evacuating from the opposite side. The coated substrate was dried and calcined at 550 for 3 hours. Zero point one gram (0.1 g) of a mixture consisting of 1 g of Ludox HS-30, 1 g of 10% TPAOH aqueous solution and 2.48 g of water was added dropwise to the surface coated with fine silicalite grains, of the porous substrate, and the coated substrate was dried at room temperature overnight and treated with water vapor at 150° C. for 5 days. The sample membrane was washed with water and dried, and it was confirmed with X-ray diffraction and electron microscope that a thin silicalite membrane was formed on the porous substrate.

The sample membrane was calcined at 550° C. for 2 hours. The heating rate for the calcination was set at 0.60° C./min and the cooling rate was set at 1.2° C./min. As a result of X-ray diffraction and electron microscope observation, it was confirmed that a thin silicalite membrane was formed on the porous substrate.

According to the method of Examples 4 and 5, the permeation characteristics were evaluated. CB/AD was 5.4, and the hydrogen permeation rate was $9.8 \times 10^{-7}$ mol/s·m²·Pa. It was also confirmed that the hydrogen permeation rate remained constant for more than 4 hours after passage of 4 hours following the start of the experiment.

Example 10

Producing a Composite Membrane Consisting of Fine Silica Grains and Silicalite

Zero point one gram (0.1 g) of a gel with a composition of 40 $SiO_2$:12 TPAOH (tetrapropylammonium hydroxide): 1680 $H_2O$ was added dropwise to the surface treated with fine alumina grains, of a square α-alumina porous substrate having a side length of 1.4 cm and a thickness of 3 mm (produced by NGK INSULATORS LTD., coated with fine alumina grains to have a thickness of about 50 μm on one side only and having an average pore size of 0.1 μm), and the coated substrate was dried at room temperature overnight and treated with water vapor at 150 for 5 days. The sample membrane was washed with water and dried, and it was confirmed with X-ray diffraction and electron microscope that a thin silicalite membrane was formed on a ceramic plate. The obtained sample membrane was lower in X-ray intensity than the sample membranes of Examples 3, 7 and 9 and some portions were not crystallized. It is considered that the crystallization rate was low in Example 10 since no seed crystal was used.

The permeable membrane of this example was a composite membrane containing silicalite and fine silica grains. The obtained sample membrane was calcined at 550 for 2 hours. The heating rate for the calcination was set at 0.6° C./min and the cooling rate was set at 1.2° C./min.

According to the method of Examples 4 and 5, the permeation characteristics were evaluated. The CB/AD ratio was 2.6, and the hydrogen permeation rate was $7.0 \times 10^{-7}$ mol/s·m²·Pa. Furthermore, it was confirmed that the hydrogen permeation rate remained constant for more than 4 hours after passage of 4 hours following the start of the experiment. This result shows that even a membrane of fine inorganic oxide grains can similarly be a permeable membrane of this invention.

Example 11

Synthesizing a SAPO-34 Membrane

A square α-alumina porous substrate having a side length of 1.4 cm and a thickness of 3 mm (produced by NGK INSULATORS LTD, coated with fine alumina grains to have a thickness of about 50 μm on one side only and having an average pore size of 0.1 μm) was immersed in a gel with a composition of $Al_2O_3$:$P_2O_5$: 0.5$SiO_2$: 1.03TEAOH (tetraethylammonium hydroxide): 56$H_2O$ and heated in an autoclave at 195 for 24 hours. The obtained sample membrane was burned at 500 for 2 hours. The heating rate for the burning was set at 0.6° C./min and the cooling rate was set at 1.2° C./min. It was confirmed with X-ray diffraction and electron microscope that a membrane of SAPO-34 was formed on the porous substrate.

According to the method of Examples 4 and 5, the permeation characteristics were evaluated. The CB/AD ratio was 2.4, and the hydrogen permeation rate was $4.0 \times 10^{-7}$ mol/s·m²·Pa. Furthermore, it was confirmed that the hydrogen permeation rate remained constant for more than 4 hours after passage of 4 hours following the start of the experiment.

This result shows that not only a crystalline silicate and a crystalline aluminosilicate but also an aluminophosphate zeolite can similarly be a permeable membrane of this invention.

Example 12

Synthesizing a Silicalite Membrane According to a Water Vapor Method, and Evaluating the Permeability of Ethylene Glycol and Ammonia The colloid obtained in Example 1 was diluted with water, to obtain 1% colloid solution, and 9 g of the colloid solution was kept in contact with the surface treated with fine alumina grains, of a square α-alumina porous substrate having a side length of 1.4 cm and a thickness of 3 mm (produced by NGK INSULATORS LTD., coated with fine alumina grains to have a thickness of about 50 $\mu$m on one side only and having an average pore size of 0.1 $\mu$m), and was caused to adhere to the porous substrate by evacuating from the opposite side. The coated substrate was dried and calcined at 550° C. for 3 hours. A mixture consisting of 1 g of Ludox HS-30 and 1 g of 10% TPAOH aqueous solution was kept in contact for 10 seconds with the surface coated with fine alumina grains, of the substrate coated with fine silicalite grains, and the substrate was pulled up, dried at room temperature for 1 hour and treated with water vapor at 150° C. for 5 days. The obtained sample membrane was washed with water, dried and calcined at 500° C. for 2 hours. The heating rate for the calcination was set at 0.6° C./min and the cooling rate was set at 1.2° C./min. It was confirmed with X-ray diffraction and electron microscope that a thin silicalite membrane was formed on the porous substrate.

Furthermore, a permeation cell was prepared as described for Example 4, and ethylene glycol was used instead of the water of Example 5. The apparatus as a whole was kept at 65, and a gas at 2 atmospheric pressure (0.2M Pa)containing ethylene glycol having saturated vapor pressure at 65 and hydrogen was kept in contact with the permeable membrane surface of this invention. With the opposite surface of the membrane kept at atmospheric pressure, the gas was caused to permeate at a differential pressure of about 1 atmospheric pressure (0.1M Pa), to measure the hydrogen permeation rate. In the beginning of measurement, the hydrogen permeation rate was $4.8\times10^{-7}$ mol/s·m²·Pa. The hydrogen permeation rate rapidly decreased in the first 12 hours from the start of the experiment, and remained stable for 4 hours after. The stable value was $4.3\times10^{-8}$ mol/s·m²·Pa.

Figure 5:
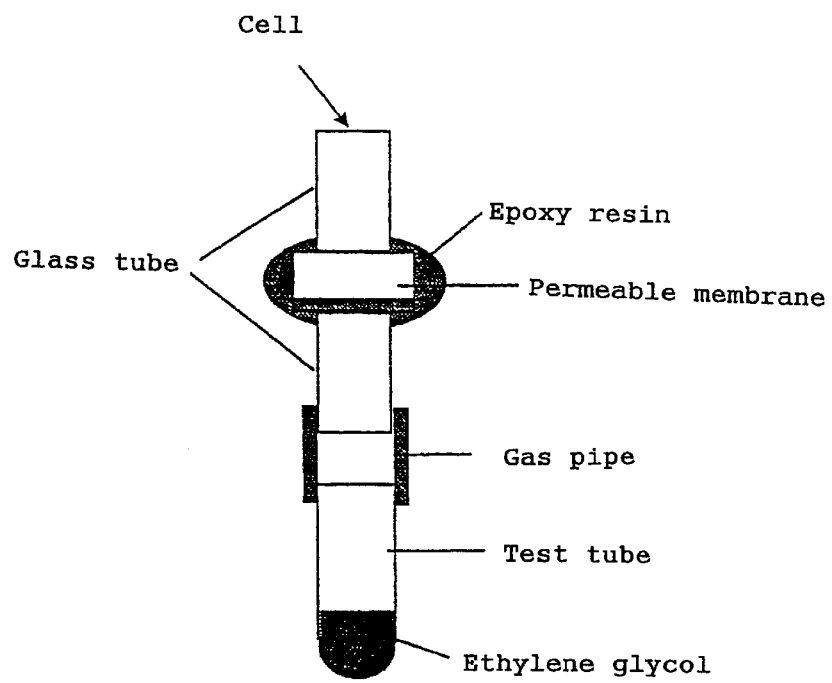
FIG. 5 is a schematic side elevation for illustrating the ethylene permeation characteristics of the permeable membrane of this invention.

Then, as shown in FIG. 5, a test tube having an inner diameter of 1 cm and a length of 6 cm was charged with 2 g of ethylene glycol, and a permeation cell was connected to the test tube using a gas pipe as shown in FIG. 5. The assembly was placed in an 85 oven, and the ethylene glycol decrease rate per 1 cm² of permeation area was measured and found to be $6.0\times10^{-4}$ g/hour.

In the apparatus of FIG. 5, 5% ammonium adipate ethylene glycol solution was used instead of ethylene glycol (EG), and was allowed to stand at 85 for 2 hours. After 2 days, the temperature was returned to room temperature, and the solution in the apparatus was titrated with 1/100N NaOH aqueous solution using phenolphthalein as an indicator. The value was $3.0\times10^{-4}$ equivalent per 1 cm² of the permeable membrane.

Example 13

Zero point one gram of a mixture consisting of 1 g of Ludox HS-30 and 1 g of 10% TPAOH aqueous solution was added dropwise to the substrate coated with a seed crystal obtained in Example 2, and the coated substrate was dried at room temperature overnight and treated with water vapor at 150 for 5 days. Then, furthermore, the operation of adding 0.1 g of said mixture consisting of Ludox HS-30 and 10% TPAOH aqueous solution dropwise, drying and heating in an autoclave was repeated twice. The obtained sample membrane was burned at 550° C. for 2 hours. The heating rate for the burning was set at 0.6° C./min and the cooling rate was set at 1.2° C./min. As a result of X-ray diffraction and electron microscope observation, it was confirmed that a thin silicalite membrane was formed on a ceramic plate.

To 5 parts by weight of an emulsion-like silicone solution (BY22-826 produced by Toray Dow Corning Silicone), 95 parts by weight of ion exchange water were added, and the mixture was stirred for about 5 minutes, to form a homogeneous solution. Zero point zero two gram (0.02 g) of the obtained solution was added dropwise to the surface of the sample membrane and evacuation was executed for about 10 minutes on the opposite side of the sample membrane for sucking it. The sample membrane was allowed to stand at room temperature overnight.

According to the method of Examples 4 and 5, the permeation characteristics were evaluated. The hydrogen permeation rate was $2.3\times10^{-8}$ mol/s·m²·Pa. Furthermore, it was confirmed that the hydrogen permeation rate remained constant for more than 4 hours after passage of 4 hours following the start of the experiment.

A test tube with an inner diameter of 1 cm was charged with 2 g of ethylene glycol, and as shown in FIG. 5, a permeation cell was connected to the test tube using a gas pipe. The assembly was placed in a 85° C. oven, and the ethylene glycol decrease rate per 1 cm² of permeation area was measured and found to be $4.8\times10^{-4}$ g/hour.

The permeable membrane was hydrophobic on the surface. Water, ethylene glycol and y-butyrolactone were respectively added dropwise to the permeable membrane, but they formed droplets without forming a liquid film. Thus, it was found that the permeable membrane repelled these polar solvents. Subsequently the permeable membrane was turned upside down to remove the droplets with gravity and brought into contact with hydrogen of 2 atmospheric pressure at room temperature, to measure the hydrogen permeation rate. Hydrogen permeated through the membrane as it did before the polar solvents were added dropwise.

Thus, it was confirmed that a zeolite membrane, the outermost surface layer of which was covered with a silicone compound, was resistant against polar solvents.

Example 14

Producing a Silicone Rubber Membrane

Eighty parts by weight of m-xylene were added to 20 parts by weight of a room temperature curing deoximized silicone rubber (SE5060 produced by Toray Dow Corning Silicone), and the mixture was stirred for about 5 minutes to form a homogeneous solution. Only the surface treated with fine alumina grains, of a square α-alumina porous substrate having a side length of 1.4 cm and a thickness of 3 mm (produced by NGK INSULATORS LTD., coated with fine alumina grains to have a thickness of about 50 $\mu$m on one side only and having an average pore size of 0.1 $\mu$m) was kept in contact with the obtained silicone rubber solution for about 5 seconds. Then, the membrane was allowed to stand at room temperature for 1 day.

A section of the permeable membrane obtained like this was observed with FE-SEM, and it was confirmed that a 3 to 5 µm thick silicone rubber membrane was prepared.

According to the method of Examples 4 and 5, the permeation characteristics were evaluated. The CB/AD ratio was 2.0, and the hydrogen permeation rate was $2.8\times10^{-8}$ mol/s·m²·Pa. Furthermore, it was confirmed that the hydrogen permeation rate remained constant for more than 4 hours after lapse of 4 hours following the start of the experiment.

Example 15

Producing a Silicone Rubber Membrane

Only the surface treated with fine alumina grains, of a square α-alumina porous substrate with a side length of 1.4 cm and a thickness of 3 mm (produced by Nippon Glass, coated with fine alumina grains to have a thickness of about 50 µm on one side only and having an average pore size of 0.1 µm) was kept in contact with a non-diluted room temperature curing deoximized silicone rubber solution (SE5070 produced by Toray Dow Coning Silicone) for about 5 seconds, and was allowed to stand at room temperature for 1 day.

A section of the permeable membrane obtained like this was observed with FE-SEM, and it was confirmed that an about 200 µm thick silicone rubber membrane was prepared.

According to the method of Example 4, a permeation cell was prepared and brought into contact with hydrogen of 2 atmospheric pressure at room temperature. The hydrogen permeation rate was measured and found to be $4.4\times10^{-9}$ mol/s·m²·Pa.

A test tube with an inner diameter of 1 cm was charged with 2 g of ethylene glycol, and the permeation cell was connected using a gas pipe as shown in FIG. 5. The assembly was placed in a 85° C. oven. The ethylene glycol decrease rate per 1 cm² of permeation area was measured and found to be $2.4\times10^{-3}$ g/hour.

Example 16

Preparing an Electrolytic Capacitor

A silica powder was tableted to make a cylindrical pellet having a diameter of 5 mm and a thickness of 5 mm. The pellet was immersed for 5 minutes in 20% colloidal silica obtained by diluting colloidal silica LUDOX AS-40 to double with water, pulled up, and dried at 80° C. The pellet was immersed in the 1% silicalite colloid solution used in Examples 1 through 6 for 5 minutes, pulled up, dried at room temperature and calcined at 500° C. The obtained pellet was immersed in a mixture consisting of 1 g of Ludox HS-30, 1 g of 20% TPAOH aqueous solution and 2.48 g of water, pulled up, allowed to stand at room temperature for 1 hour, and heated at 150° C. under water vapor pressurization for 5 days. The sample membrane was washed with water and calcined at 550 for 2 hours. The heating rate for the calcination was set at 0.6° C./min and the cooling rate was set at 1.2° C./min. It was confirmed with X-ray diffraction and electron microscope that a thin silicalite membrane was formed on the substrate.

Figure 7:
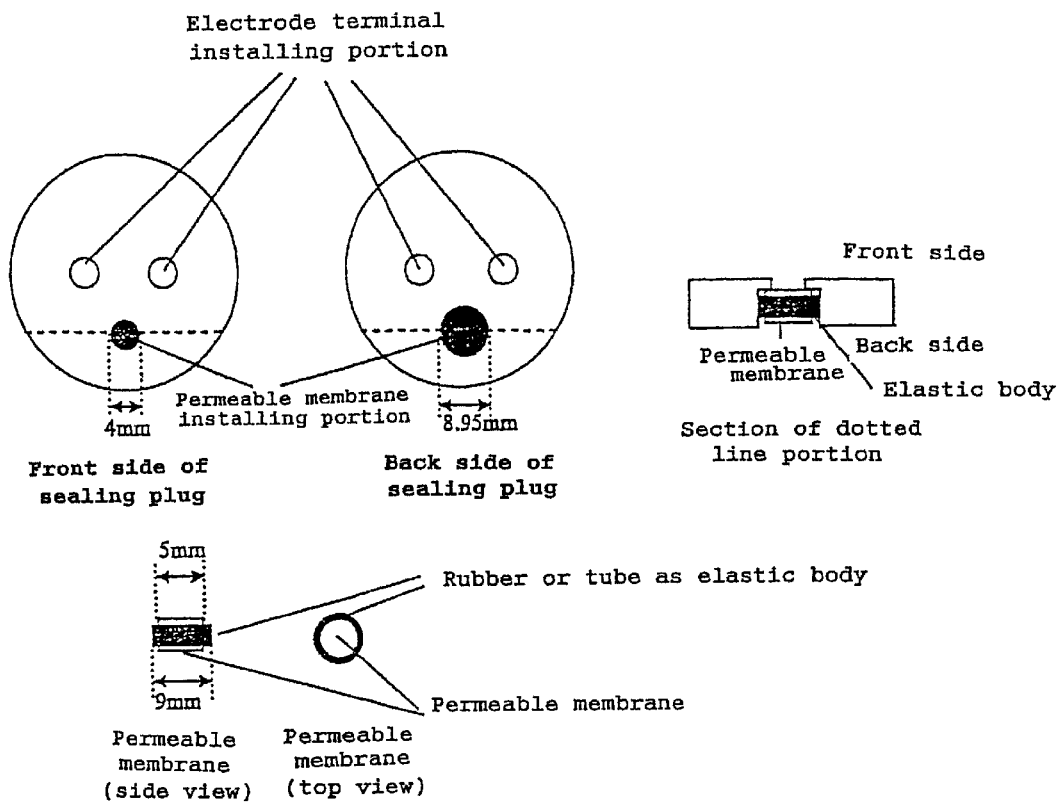
FIG. 7 is a schematic drawing for illustrating how the permeable membrane is installed at the sealing plug of an electrolytic capacitor in the process for producing the electrolytic capacitor using the permeable membrane of this invention.

Around the pellet, a silicone rubber tube with a thickness of 2 mm and an inner diameter of 5 mm was mounted (the bottom drawing in FIG. 7), and as shown in a top drawing of FIG. 7, the permeable membrane having a silicone rubber tube mounted around it was fitted into the sealing plug from the back side. The sealing plug was used to make a large threaded terminal type electrolytic capacitor as shown in FIG. 1.

Example 17

Method for Producing a Silicalite Membrane According to a Water Vapor Method

The colloid obtained in Example 1 was diluted with water to obtain 1% colloid solution, and 0.3 g of the colloid solution was added dropwise to the surface treated with fine alumina grains, of a square α-alumina porous substrate having a side length of 1.4 cm and a thickness of 3 mm (produced by NGK INSULATORS, LTD., coated with fine alumina grains to have a thickness of about 50 µm on one side only and having an average pore size of 0.1 µm), for uniformly coating the surface, and the coated substrate was dried, and calcined at 550 for 3 hours. The surface coated with the fine silicalite grains of the porous substrate was immersed in a mixture consisting of 5 g of Ludox HS-30 and 5 g of 10% TPAOH aqueous solution and the substrate was pulled up. Then, it was dried at room temperature for 2 hours and treated with water vapor at 150 for 5 days. It was confirmed with X-ray diffraction and electron microscope that a thin silicalite membrane was formed on the porous substrate.

The obtained sample membrane was calcined at 550° C. for 2 hours. The heating rate for the calcination was set at 0.6° C./min and the cooling rate was set at 1.2° C./min. As a result of X-ray diffraction and electron microscope observation, it was confirmed that a thin silicalite membrane was formed on the substrate.

According to the method of Example 4, a permeation cell was prepared, and the surface having the film formed was kept in contact with hydrogen of 2 atmospheric pressure. The opposite side was connected to a soap film flow meter, and the hydrogen permeation rate was measured and found to be $3.0\times10^{-7}$ mol/s·m²·Pa.

Figure 8:
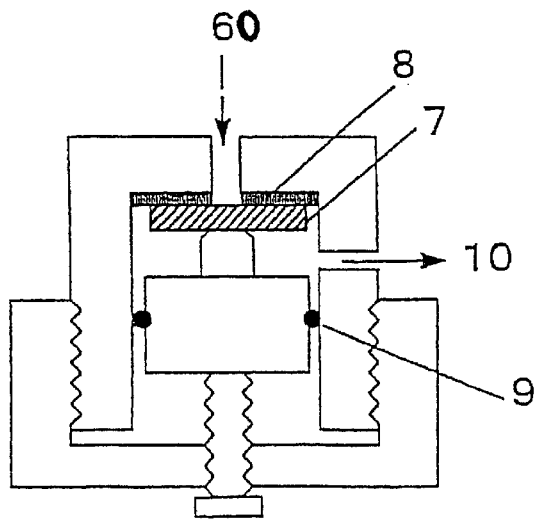
FIG. 8 is a schematic side elevation showing an instrument for measuring the gas permeation rate, as an example, of a permeable membrane fixed with an elastic silicone rubber intervening between the permeable membrane and the measuring instrument.

The same membrane as above was set in a gas permeation rate measuring instrument as shown in FIG. 8. The instrument was made of stainless steel, and the gas was supplied from a gas supply port 60. The permeable membrane 7 was fixed with an elastic silicone rubber 8 intervening between the permeable membrane 7 and the instrument, and the surface having the functional layer of the permeable membrane 7 was turned toward the gas side indicated by the gas supply port 60. To prevent the gas from leaking from the clearance between the silicone rubber 8 and the permeable membrane 7, the surface opposite to the surface having the functional layer of the permeable membrane 7 was pressed by a stainless steel fitting. Since the fitting was fixed with an O ring 9, it did not happen that the gas permeating through the permeable membrane 7 leaked anywhere but out the permeating gas outlet 10.

This instrument was used to measure the hydrogen gas permeation rate. The hydrogen pressure on the supply side was set at 2 atmospheric pressure, and the quantity of the hydrogen gas coming out after permeation through the permeable membrane was measured using the soap film flow meter and found to be $3.0\times10^{-7}$ mol/s·m²·Pa, being the same as the measurement result with the permeation cell using the adhesive of Example 4. This result shows that the permeable membrane of this invention can be installed with good adhesion using an elastic body together.

Example 18

Producing an MFI Zeolite Membrane of this Invention

Zero point one gram (0.1 g) of a mixed sol consisting of LUDOX HS-30 and 10% TPAOH aqueous solution (1:1)

was added dropwise to the surface coated with fine silicalite grains of the substrate obtained in Example 2, and the coated substrate was dried at room temperature for 1 hour and treated with water vapor at 175° C. for 5 days. The obtained sample membrane was washed with water, dried and calcined at 550° C. for 2 hours. The heating rate for the burning was set at 0.6° C./min and the cooling rate was set at 1.2° C./min. It was confirmed with X-ray diffraction and electron microscope that a thin silicalite membrane was formed on the substrate. The thickness of the zeolite membrane was about 2 μm.

Figure 9:
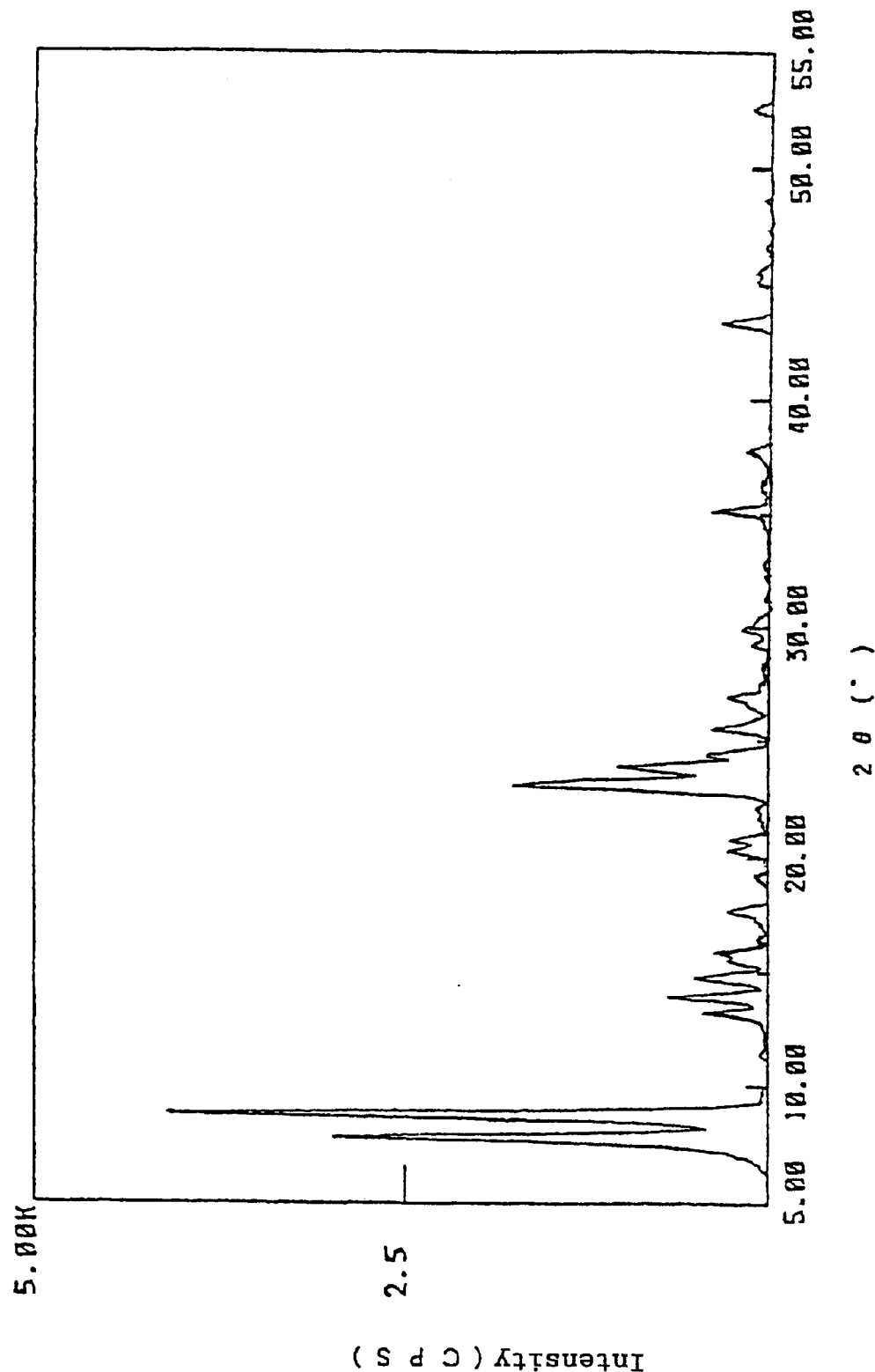
FIG. 9 is an X-ray diffraction diagram of the zeolite membrane obtained in Example 18 of this invention.

The X-ray diffraction pattern of the obtained zeolite membrane is shown in FIG. 9. The X-ray diffractometry was executed using CuKα as the X-ray source (wavelength=1.54 angstroms) with the incident angle set at 3 degrees at a scanning speed of 2θ 4 degrees/min in a parallel optical system. From FIG. 9, with the maximum peak intensity in a 2θ range of 7.3 to 8.2 degrees as a, the maximum peak intensity in a 2θ range of 8.5 to 9.1 degrees as b and the maximum peak intensity in a 2θ range of 13.0 to 14.2 degrees as c, the values of a/b and b/c were 0.73 and 5.88 respectively.

Example 19

Test for Separating Hydrogen and Water Vapor

For the silicalite membrane prepared in Example 18, the permeation characteristics were evaluated according to the method of Examples 4 and 5.

The silicalite membrane of Example 18 had a CB/AD value of 3.6 and a hydrogen permeation rate of $5.0 \times 10^{-7}$ mol/s·m²·Pa, and was found to be higher in permeation rate and selective separation factor compared to that of Example 6. The reason is considered to be that the silicalite membrane was specially oriented (the silicalite membrane prepared according to a hydrothermal synthesis method used in Example 6 was 1.96 in a/b and 2.43 in b/c).

Example 20

Figure 10:
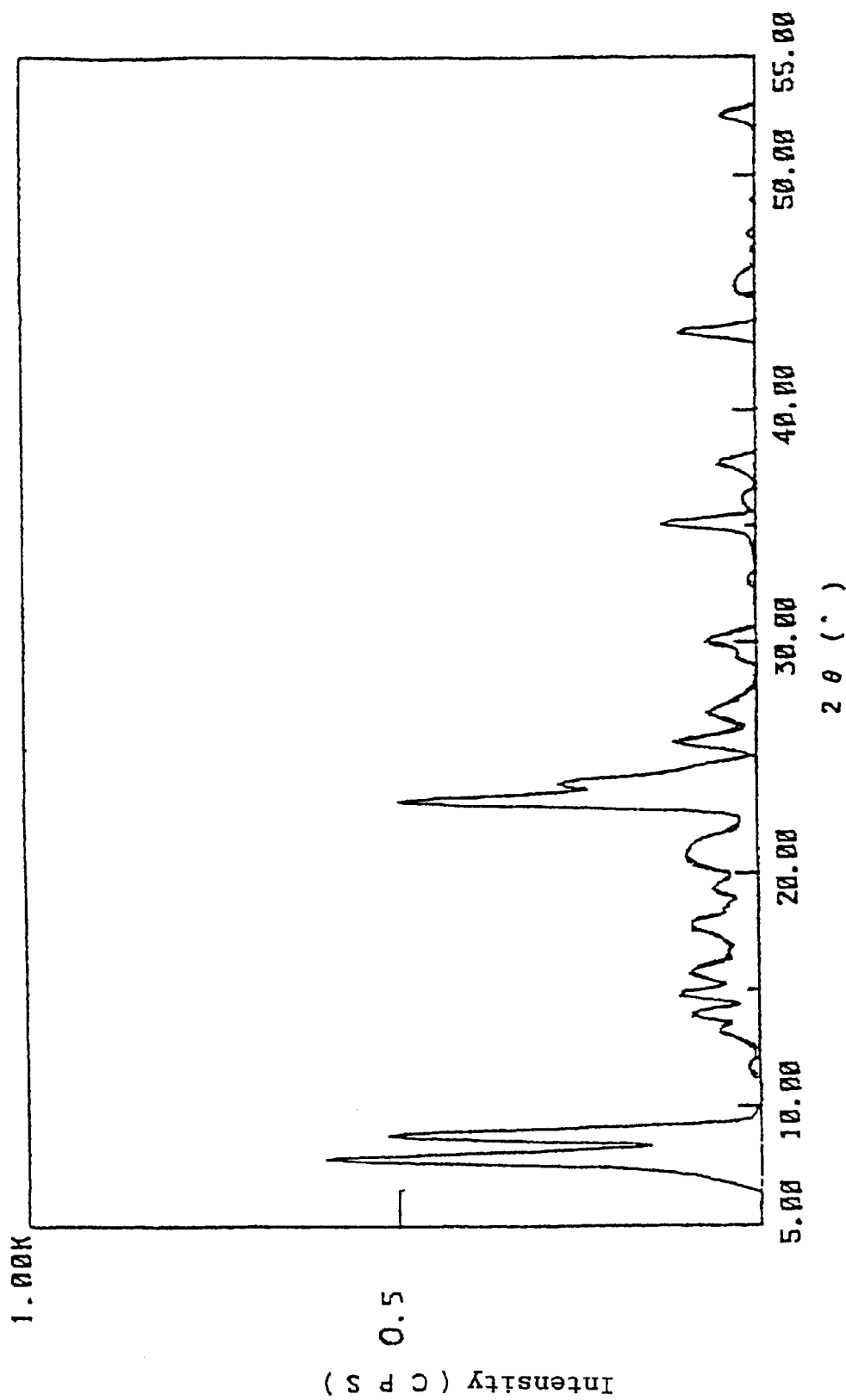
FIG. 10 is an X-ray diffraction diagram of the permeable membrane of Example 20 of this invention.

Zero point one gram of a mixture consisting of 1 g of LUDOX HS-30 and 1 g of 10% TPAOH aqueous solution was added dropwise as uniformly as possible to the surface coated with fine silicalite grains, of the substrate obtained in Example 2, and the coated substrate was dried at room temperature for 1 hour and treated with water vapor at 150 for 5 days. The obtained sample membrane was calcined at 550° C. for 2 hours. The heating rate for the calcined was set at 0.6° C./min and the cooling rate was set at 1.2° C./min. It was confirmed with X-ray diffraction and electron microscope that a thin silicalite membrane was formed on the porous substrate. The X-ray diffraction pattern of this membrane is shown in FIG. 10. The X-ray diffractometry was executed using CuKα as the X-ray source (wavelength=1.54 angstroms) with the incident angle fixed at 3 degrees at a scanning speed of 2θ 4 degrees/min in a parallel optical system. From FIG. 10, with the maximum peak intensity within a 2θ range of 7.3 to 8.2 degrees as a, the maximum peak intensity within a 2θ range of 8.5 to 9.1 degrees as b and the maximum peak intensity within a 2θ range of 13.0 to 14.2 degrees as c, the values of a/b and b/c were 1.16 and 5.38 respectively.

Example 21

Figure 11:
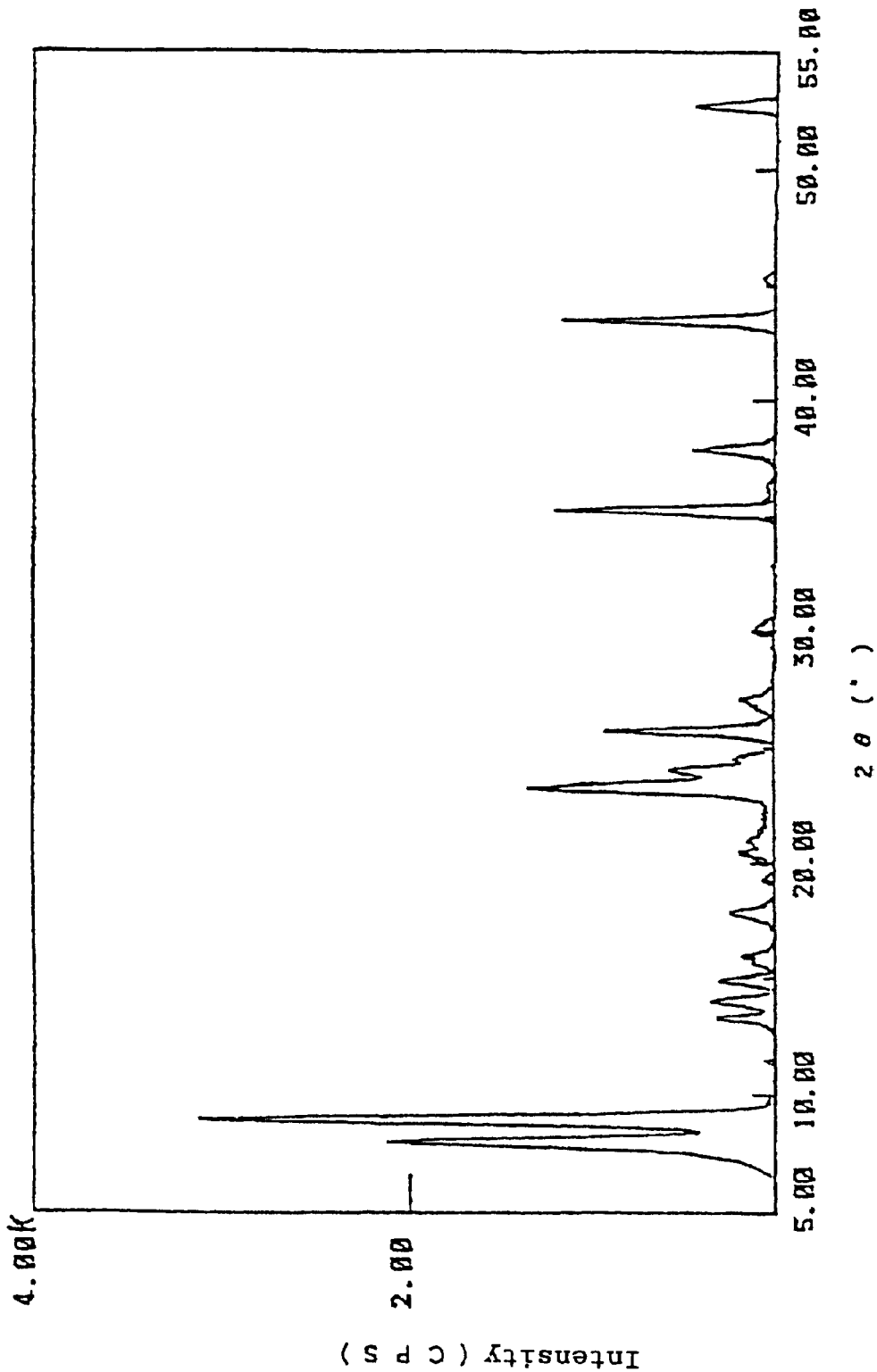
FIG. 11 is an X-ray diffraction diagram of the permeable membrane of Example 21 of this invention.

The surface treated with fine alumina grains of a square α-alumina porous substrate having a side length of 1.4 cm and a thickness of 3 mm (produced by NGK INSULATORS LTD., coated with fine alumina grains to have a thickness of about 50 μm on one side only and having an average pore size of 0.1 μm) was dipped in LUDOX HS-30 diluted with water to double, three times for coating, and then was dipped in a mixed sol of HS-30: 20% TPAOH aqueous solution: 8% silicalite colloid (seed crystal: Example 1)=1: 1:2 for coating. Then, the coated substrate was dried at room temperature in vacuum and treated with water vapor at 150 for 5 days. The obtained sample membrane was calcined at 550° C. for 2 hours. The heating rate for the burning was set at 0.6° C./min and the cooling rate was set at 1.2° C./min. It was confirmed with X-ray diffraction and electron microscope that a thin silicalite membrane was formed on the porous substrate. The X-ray diffraction pattern of this membrane is shown in FIG. 11. The X-ray diffractometry was executed using CuKα as the X-ray source (wavelength=1.54 angstroms) with the incident angle fixed at 3 degrees at a scanning speed of 2θ 4 degrees/min in a parallel optical system. With the maximum peak intensity within a 2θ range of 7.3 to 8.2 degrees as a, the maximum peak intensity within a 2θ range of 8.5 to 9.1 degrees as b and the maximum peak intensity within a 2θ range of 13.0 to 14.2 degrees as c, the values of a/b and b/c were 0.68 and 8.33 respectively.

From the results of Examples 17 through 21, it can be seen that if a membranous substance containing a seed crystal and silica is treated with water vapor, a zeolite membrane can be crystallized within a moderate time, and that a specially oriented MFI zeolite membrane can be produced. It was also demonstrated that the specially oriented membrane had good permeation characteristics.

Example 22

Method for Producing a Silicalite Membrane According to a Water Vapor Method

The colloid obtained in Example 1 was diluted with water to obtain 1% colloid solution, and 88 mg of it was added dropwise to the surface treated with fine alumina grains, of a cylindrical α-alumina porous substrate having a diameter of 9.6 mm and a thickness of 2.0 mm (obtained by processing a ceramic film (100 mm×100 mm×3 mm thick) produced by NGK INSULATORS, LTD., coated with fine alumina grains to have a thickness of about 50 μm on one side only and having an average pore size of 0.1 μm), to be deposited on the porous substrate, and the coated substrate was dried at room temperature overnight and calcined at 500° C. The surface coated with fine silicalite grains was immersed in a mixture consisting of 40 g of Ludox HS-40, 9.84 g of 54% TPAOH (obtained by concentrating 10% TPAOH aqueous solution (Tokyo Kasei) using an evaporator) and 16.8 g of water for 2 minutes, pulled up and dried at room temperature for 2 hours. It was treated with water vapor at 150° C. for 5 days, washed with water and dried. It was confirmed with X-ray diffraction and electron microscope that a thin silicalite membrane was formed on the porous substrate.

The obtained sample membrane was calcined at 550° for 2 hours. The heating rate for the calcination was set at 0.6° C./min and the cooling rate was set at 1.2° C./min. As a result of X-ray diffraction and electron microscope observation, it was confirmed that an about 1 μm thick silicalite membrane was formed on the substrate.

The X-ray diffractometry was executed using CuKα as the X-ray source (wavelength=1.54 angstroms) with the incident angle fixed at 3 degrees at a scanning speed of 2θ 4 degrees/min in a parallel optical system. With the maximum peak intensity within a 2θ range of 7.3 to 8.2 degrees as a, the maximum peak intensity within a 2θ range of 8.5 to 9.1 degrees as b and the maximum peak intensity within a 2θ range of 13.0 to 14.2 degrees as c, the values of a/b and b/c were 1.2 and 6.0 respectively.

Example 23

Preparing a Permeability Measuring Cell

Figure 12:
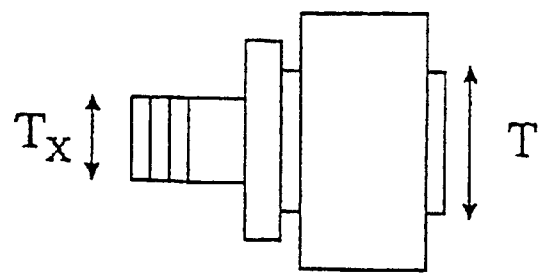
FIG. 12 is a side view of a reducer used for preparing a cell for permeability measurement.
Figure 13:
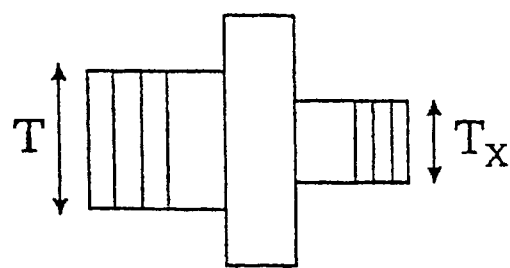
FIG. 13 is a side view of a union used for preparing a cell for permeability measurement.
Figure 14:
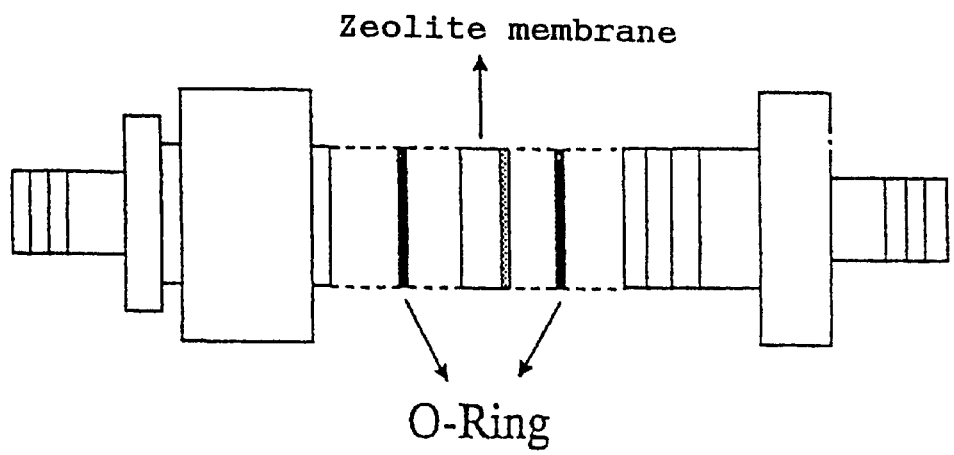
FIG. 14 is a side view showing how a cell for permeability measurement is fabricated by using the reducer of FIG. 12 and the union of FIG. 13 for fixing a permeable membrane with O rings intervening between the permeable membrane and the reducer or union.

The permeable membrane obtained in Example 22 was fixed between a reducer (SS-200-R6) produced by Swagelok shown in FIG. 12 and a reducing union (SS-600-6-2) produced by Swagelok, shown in FIG. 13, using two O rings with a diameter of 9.5 mm and a thickness of 1.9 mm kept intervening between the permeable membrane and the reducer or reducing union, as shown in FIG. 14, to make a permeation cell having a permeation area of 0.708 $cm^2$.

(FIG. 14 is a side view illustrating how the permeability measuring cell is fabricated by fixing the permeable membrane using the reducer of FIG. 12 and the union of FIG. 13, with O rings kept intervening between the permeable membrane and the reducer or union.)

Example 24

Measuring the Hydrogen Permeation Rate

Figure 15:
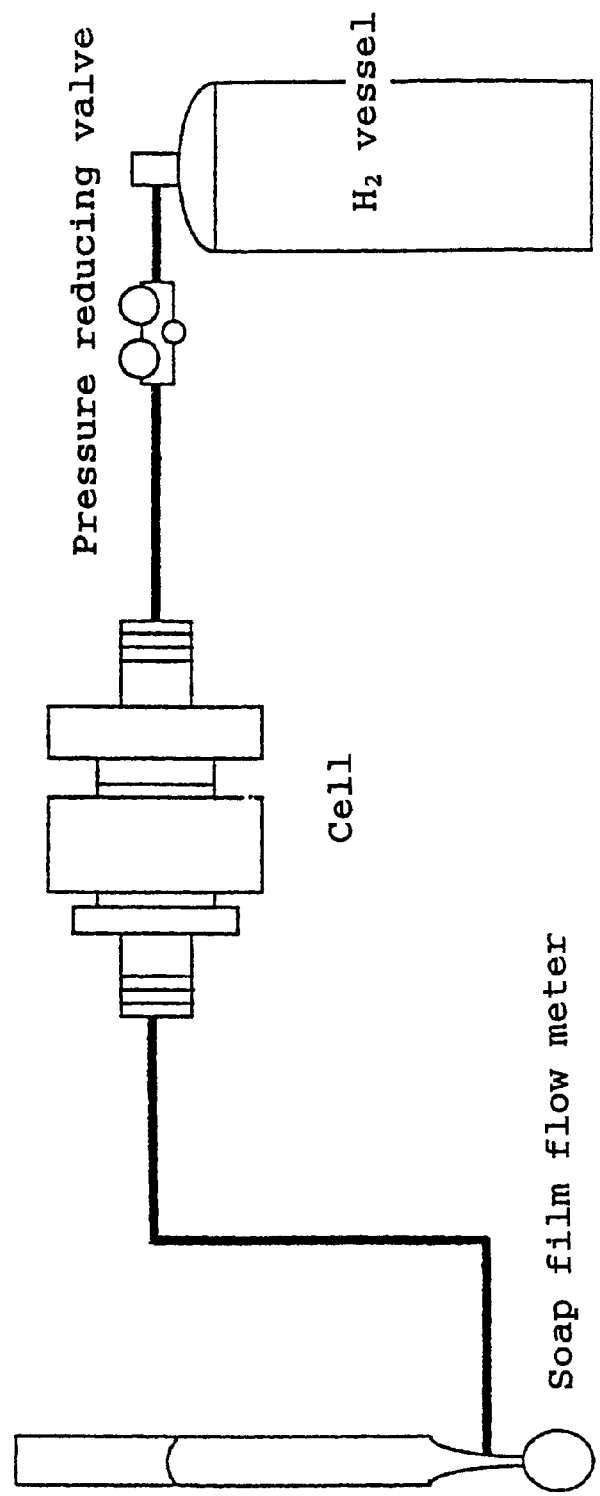
FIG. 15 is a side view showing the operation of measuring the hydrogen permeation rate using the permeation cell of FIG. 14.

The permeation cell prepared as described in Example 23 was installed in a permeation device as shown in FIG. 15, and hydrogen gas was supplied at about 2 atmospheric pressure at room temperature from a hydrogen vessel, to be kept in contact with the permeable membrane of this invention. With the opposite side of the permeable membrane kept at atmospheric pressure, the hydrogen gas was caused to permeate at a differential pressure of about 1 atmospheric pressure (0.1M PA), and the hydrogen permeation rate was measured using a soap film flow meter. In the beginning of measurement, the rate was 3.0 $10^{-7}$ mol/s·$m^2$·Pa, and for 2 hours thereafter, the permeation rate remained stable.

Also when the membrane produced according to the same method was used to make a permanence cell using an epoxy adhesive as described for Example 4, a similar transmission rate was shown. So, it can be considered also effective to install the permeable membrane held between rubber O rings in the sealing plug of an electrolytic capacitor.

Example 25

Figure 16:
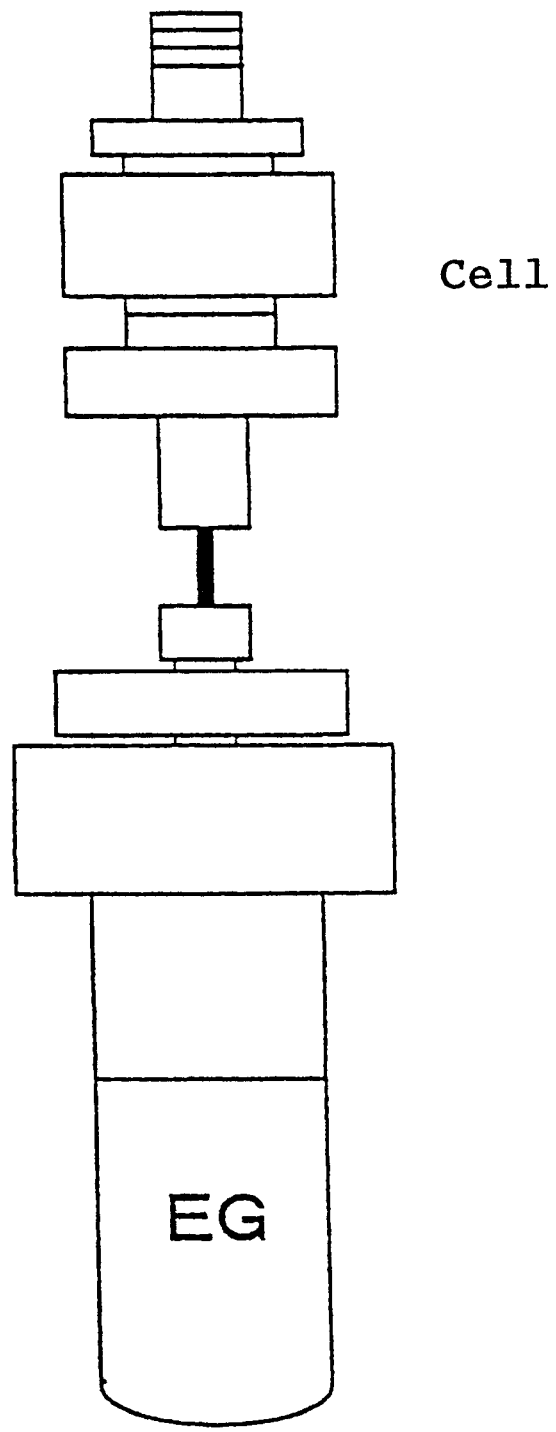
FIG. 16 is a side view illustrating how the permeability of ethylene glycol and the hydrogen permeation rate after bringing a permeable membrane into contact with ethylene glycol vapor are measured using the permeation cell of FIG. 14.

Measuring the Permeability of Ethylene Glycol and the Hydrogen Permeation Rate after Contact with Ethylene Glycol Vapor As shown in FIG. 16, a test tube with an inner diameter of 1 cm was charged with 2 g of ethylene glycol, and the permeation cell prepared in Example 23 was connected as shown in FIG. 16. The assembly was placed in a 85 oven for 24 hours, and the ethylene glycol decrease rate per 1 $cm^2$ of permeation area was measured and found to be 6.0×$10^{-4}$ g/h. Immediately, the permeation cell was installed in the permeation device of FIG. 15, and hydrogen gas was kept in contact with the permeable membrane of this invention at room temperature at about 2 atmospheric pressure. With the opposite side of the permeable membrane kept at atmospheric pressure, the hydrogen gas was caused to permeate at a differential pressure of about 1 atmospheric pressure, and the hydrogen permeation rate was measured using a soap film flow meter. In the beginning of measurement, the rate was 0.6 $10^{-7}$ mol/s·$m^2$·Pa.

Example 26

Resistance to Liquid Ethylene Glycol

A permeation cell was made as described for Example 23, and 5 mg of ethylene glycol was added dropwise to the permeable membrane produced according to the method of Example 22, to sufficiently wet the permeable membrane with ethylene glycol. The permeation cell was connected to a test tube with an inner diameter of 1 cm containing 2 g of ethylene glycol using a gas pipe as shown in FIG. 16. The assembly was placed in an oven, and every 1 to 10 hours, the assembly was taken out to measure the hydrogen permeation rate. Immediately after start of the experiment, the rate was 0, but 19 hours later, it became 1.2 $10^{-7}$ mol/s·$m^2$·Pa.

Example 27

Figure 17:
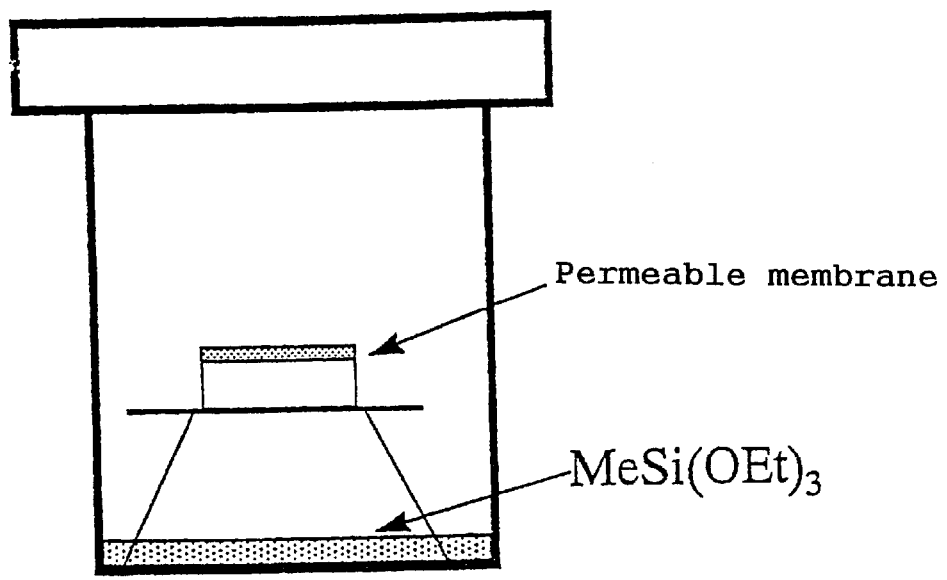
FIG. 17 is a side view illustrating a method of silane coupling agent treatment for improving the performance of a permeable membrane.

Performance Improvement of a Permeable Membrane by Silane Coupling Agent Treatment The permeable membrane produced according to the method of Example 22 was placed in an autoclave containing triethoxymethylsilane as shown in FIG. 17, and heated at 150° C. for 24 hours. In succession, it was calcined at 550 for 2 hours. The heating rate for the calcination was set at 0.6° C./min and the cooling rate was set at 1.2° C./min.

According to the method of Examples 23 and 24, the permeation characteristics were evaluated. The hydrogen permeation rate was 0.92 $10^{-7}$ mol/s·$m^2$·Pa, and for 1 hour thereafter, the permeation rate remained stable.

According to the method of Example 25, the hydrogen permeation rate after contact with ethylene glycol vapor was measured and found to be 0.47 $10^{-7}$ mol/s·$m^2$·Pa. The difference of hydrogen permeation rate before and after contact with ethylene glycol vapor was 0.45×$10^{-7}$ mol/s·$m^2$·Pa.

Example 28

Measuring the Hydrogen Permeation Rate in the Presence of γ-butyrolactone Vapor The membrane produced according to the method of Example 22 was used to make a permeation cell as shown in FIG. 3, and the permeation cell was used to assemble an apparatus as shown in FIG. 4. Using γ-butyrolactone instead of the water of Example 5, the apparatus as a whole was kept at 65° C., and a gas of 2 atmospheric pressure (0.2M Pa) containing γ-butyrolactone having saturated vapor pressure at 65° C. and hydrogen was kept in contact with the permeable membrane of this invention. With the opposite side of the permeable membrane kept at atmospheric pressure, the gas was caused to permeate at a differential pressure of about 1 atmospheric pressure (0.1M Pa), and the hydrogen permeation rate was measured. The hydrogen permeation rate became stable 24 hours after start of experiment, and remained stable for 8 hours thereafter. The stable value was 1.0×$10^{-7}$ mol/s·$m^2$·Pa.

Example 29

Method for Synthesizing a Silicalite Membrane Coated with a Raw Sol According to a Spin Coat Method Zero point two four gram (0.24 g) of the 8% silicalite colloid obtained in Example 1 was added dropwise to the surface treated with fine alumina grains, of a circular α-alumina porous substrate having a diameter of 9.6 mm and a thickness of 2 mm (produced by NGK INSULATORS, LTD., coated with fine alumina grains to have a thickness of about 50 μm on one side only and having an average pore size of 0.1 μm), as uniformly as possible for coating, and the coated substrate was dried and calcined at 550° C. for 3 hours. The porous substrate was fixed on the central shaft of a motor. In this case, the central shaft of the motor was made to agree with the center of the substrate. While the motor was revolved at 200 rpm, 0.1 g of a sol with a composition of 10 $SiO_2$ (Ludox HS-30 produced by Du Pont Co.): TPAOH (tetrapropylammonium hydroxide produced by Tokyo Kasei, 10% aqueous solution) was added dropwise to about the center of the substrate, to be uniformly dispersed on the substrate by the centrifugal force of revolution. The coated substrate was dried at room temperature overnight and treated with water vapor at 150° C. for 5 days. It was confirmed with X-ray diffraction and electron microscope that a thin silicalite membrane was formed on the porous substrate. The obtained sample membrane was calcined at 550° C. for 2 hours. The heating rate for the calcination was set at 0.6° C./min and the cooling rate was set at 1.2° C./min. Also from the result of X-ray diffraction and electron microscope, it was confirmed that a thin silicalite membrane was formed.

Industrial Applicability

The permeable membrane of this invention allows a gas such as hydrogen to permeate in the presence of polar molecules of water, ethylene glycol or ammonia, etc. In addition, it is excellent also in heat resistance and chemicals resistance and can be used also for high temperature applications of higher than 150° C.

There are many applications in which a gas is allowed to permeate or is separated in the presence of polar molecules of water, ammonia, ethylene glycol, etc. A membrane that not only allows the permeation of a gas but also has a nature of being unlikely to allow the permeation of polar molecules can be used for various applications.

Therefore, the permeable membrane of this invention is effective for purifying hydrogen. For example, it is effective for separating the hydrogen of the fuel used, for example, in fuel cells, from water, carbon monoxide, carbon dioxide, etc.

Furthermore, in the case where the permeable membrane of this invention is used for an electrolytic capacitor, the capacitor can contain a hydrogen gas permeation element having a hydrogen gas permeable membrane with specific performance. Therefore, even if an excessive current corresponding to hundreds of times of the practical level flows, the hydrogen gas generated in the electrolytic capacitor vessel permeates through the hydrogen gas permeable membrane, to be discharged outside the electrolytic capacitor, without causing the vessel to be broken or damaged by the increase of internal pressure and without greatly losing the electrolyte.

This invention provides a permeable membrane capable of supporting the above-mentioned prior art and also the future art like fuel cells, and also provides an electrolytic capacitor using the permeable membrane and a method for producing the permeable membrane. So, the industrial application value of this invention is high.

What is claimed is:

1. A permeable membrane, comprising a porous substrate and a functional layer provided on the surface of and/or inside the porous substrate, said functional layer having a hydrogen permeation rate of $1 \times 10^{-10}$ mol/s·m²·Pa or more, and satisfying at least one of the following properties (1) through (3), as follows:
   (1) Hydrogen is selectively caused to permeate preferentially to water vapor;
   (2) When a test tube containing ethylene glycol and sealed with said permeable membrane is placed in a 85° C. oven, the ethylene glycol decrease rate measured is $1 \times 10^{-2}$ g/hour or less, per square centimeter (1 cm²) of the permeable membrane; and
   (3) When a test tube containing 5% ammonium adipate ethylene glycol solution and sealed with said permeable membrane is placed in a 85° C. oven for 2 days, the acid quantity of the solution is $5 \times 10^{-3}$ equivalent or less, per square centimeter of said permeable membrane.

2. The permeable membrane according to claim 1, wherein said functional layer comprises at least one of the following ingredients (1) through (5):
   (1) A zeolite and/or zeolite analog;
   (2) Fine inorganic oxide grains;
   (3) A silicone rubber, silicone resin or silicone oil;
   (4) An organic polymer compound; and
   (5) Carbon.

3. The permeable membrane according to claim 2, wherein said zeolite and/or zeolite analog is a high silica and/or pure silica zeolite.

4. The permeable membrane according to claim 3, wherein the difference between the hydrogen permeation rate of the permeable membrane at room temperature after calcination and the hydrogen permeation rate at room temperature immediately after keeping the permeable membrane in contact with saturated vapor of ethylene glycol for 24 hours is $2 \times 10^{-7}$ mol/m²·sect·Pa or less.

5. The permeable membrane according to claim 1, wherein said functional layer is arranged as the outermost surface layer and is covered with a silicone compound, and wherein said functional layer comprises a zeolite and/or a zeolite analog.

6. The permeable membrane according to claim 1, wherein said porous substrate comprises a ceramic.

7. The permeable membrane according to claim 1, wherein said permeable membrane has an average pore size of less than 0.5 μm.

8. An electrolytic capacitor, having a permeable membrane as set forth in claim 1.

9. The electrolytic capacitor according to claim 8, wherein said permeable membrane is installed in a sealing plug, with an elastic body positioned between said permeable membrane and said sealing plug.

10. The electrolytic capacitor according to claim 8, wherein the porous substrate is inorganic.

11. An MFI zeolite membrane, satisfying the following two conditions (1) and (2):

$$a/b = 0.3 \text{ to } 1.5 \quad (1)$$

$$b/c > 4.4 \quad (2)$$

where a is the maximum peak intensity within a 2θ range of 7.3 to 8.2 degrees, b is the maximum peak intensity within a 2θ range of 8.5 to 9.1 degrees, and c is the maximum peak intensity with a 2θ range of 13.0 to 14.2 degrees, respectively, in the diffraction pattern obtained by X-ray diffractometry using CuKα as the X-ray source (wavelength=1.54 angstroms) with the incident angle fixed at 3 degrees at a scanning speed of 2θ 4 degrees/min in a parallel optical system.

12. The MFI zeolite membrane according to claim 11, which has a thickness of 3 μm or less.

13. A method for separating at least one species of molecules by bringing a gas or liquid mixture consisting of at least two species of molecules into contact with a permeable membrane as set forth in claim 1 or with an MFI zeolite permeable membrane as set forth in claim 11, and selectively allowing at least one of said species of molecules to permeate said permeable membrane.

14. A method for producing a zeolite membrane containing a zeolite or zeolite analog, comprising the step of treating with water vapor a membranous substance containing a seed crystal of a zeolite or zeolite analog and silica.

15. A method for producing a zeolite membrane containing a zeolite or zeolite analog, comprising the steps of bringing a seed crystal of a zeolite or zeolite analog into contact with a porous substrate thereafter, coating said substrate with a solution, slurry or colloid containing silica, to form a membranous substance, and treating said membranous substance with water vapor.

16. The method for producing a zeolite membrane according to claim 14 or 15, wherein said water vapor is at a temperature of 80 to 200° C.

* * * * *

UNITED STATES PATENT AND TRADEMARK OFFICE
CERTIFICATE OF CORRECTION

PATENT NO. : 6,503,294 B2
DATED : January 7, 2003
INVENTOR(S) : Yoshikawa et al.

It is certified that error appears in the above-identified patent and that said Letters Patent is hereby corrected as shown below:

Column 2,
Line 35, please change "$1 \times 10^{-10} \, m^2 \cdot sec \cdot Pa$" to -- $1 \times 10^{-10} \, mol/m^2 \cdot sec \cdot Pa$ --.

Column 23,
Line 9, please change "0.60°" to -- 0.6° --; and
Line 63, please change "0.60°" to -- 0.6° --.

Signed and Sealed this

Twenty-ninth Day of July, 2003

JAMES E. ROGAN
*Director of the United States Patent and Trademark Office*